United States Patent
Williams et al.

(10) Patent No.: US 11,615,024 B2
(45) Date of Patent: Mar. 28, 2023

(54) SPECULATIVE DELIVERY OF DATA FROM A LOWER LEVEL OF A MEMORY HIERARCHY IN A DATA PROCESSING SYSTEM

(71) Applicant: INTERNATIONAL BUSINESS MACHINES CORPORATION, Armonk, NY (US)

(72) Inventors: Derek E. Williams, Round Rock, TX (US); Michael S. Siegel, Raleigh, NC (US); Guy L. Guthrie, Austin, TX (US); Bernard C. Drerup, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/394,136

(22) Filed: Aug. 4, 2021

(65) Prior Publication Data

US 2023/0042778 A1 Feb. 9, 2023

(51) Int. Cl.
*G06F 12/08* (2016.01)
*G06F 12/0811* (2016.01)

(52) U.S. Cl.
CPC ...... *G06F 12/0811* (2013.01); *G06F 2212/62* (2013.01)

(58) Field of Classification Search
CPC .......................... G06F 12/0811; G06F 2212/62
USPC ......................................................... 711/122
See application file for complete search history.

(56) References Cited

U.S. PATENT DOCUMENTS

| | | | |
|---|---|---|---|
| 7,797,526 B2 | 9/2010 | Boyle | |
| 8,423,701 B2 | 4/2013 | Perroni et al. | |
| 9,047,264 B2 | 6/2015 | Kanigicherla et al. | |
| 9,343,176 B2 | 5/2016 | Chung | |
| 10,599,602 B2 | 3/2020 | Iyer et al. | |
| 10,656,203 B1 | 6/2020 | Kishore et al. | |
| 2005/0044408 A1 | 2/2005 | Bajikar et al. | |
| 2005/0157553 A1 | 7/2005 | Perroni et al. | |
| 2017/0116103 A1 | 4/2017 | Cencini et al. | |

(Continued)

OTHER PUBLICATIONS

Huhn et al.; "A Hybrid Embedded Multichannel Test Compression Architecture for Low-Pin Count Test Environments in Safety-Critical Systems", (see as copied attached).

(Continued)

*Primary Examiner* — Hua J Song
(74) *Attorney, Agent, or Firm* — Brian F. Russell; Nathan Rau

(57) ABSTRACT

A multiprocessor data processing system includes multiple vertical cache hierarchies supporting a plurality of processor cores, a system memory, and an interconnect fabric coupled to the system memory and the multiple vertical cache hierarchies. Based on a request of a requesting processor core among the plurality of processor cores, a master in the multiprocessor data processing system issues, via the interconnect fabric, a read-type memory access request. The master receives via the interconnect fabric at least one beat of conditional data issued speculatively on the interconnect fabric by a controller of the system memory prior to receipt by the controller of a systemwide coherence response for the read-type memory access request. The master forwards the at least one beat of conditional data to the requesting processor core.

14 Claims, 14 Drawing Sheets

(56) References Cited

U.S. PATENT DOCUMENTS

2019/0220408 A1*  7/2019  Retter ................. G06F 12/0817
2019/0220410 A1*  7/2019  Retter ................. G06F 12/0817
2019/0236037 A1   8/2019  Sugumar et al.
2020/0124665 A1   4/2020  de Bakker et al.
2020/0341057 A1   10/2020 Cheng et al.

OTHER PUBLICATIONS

Williams, Michael; "Low Pin-Count Debug Interfaces for Multi-Device Systems", (see as copied attached).
Choudhury et al.; "Design and Verification Serial Peripheral Interface (SPI) Protocol for Low Power Applications", (see as copied attached).
Pierce et al.; "LPC/SPI Analysis Tool", (see as copied attached).
Stromgren, Martin; "Mitigation of GX209HA Processor for Usage in Space", (see as copied attached).

* cited by examiner

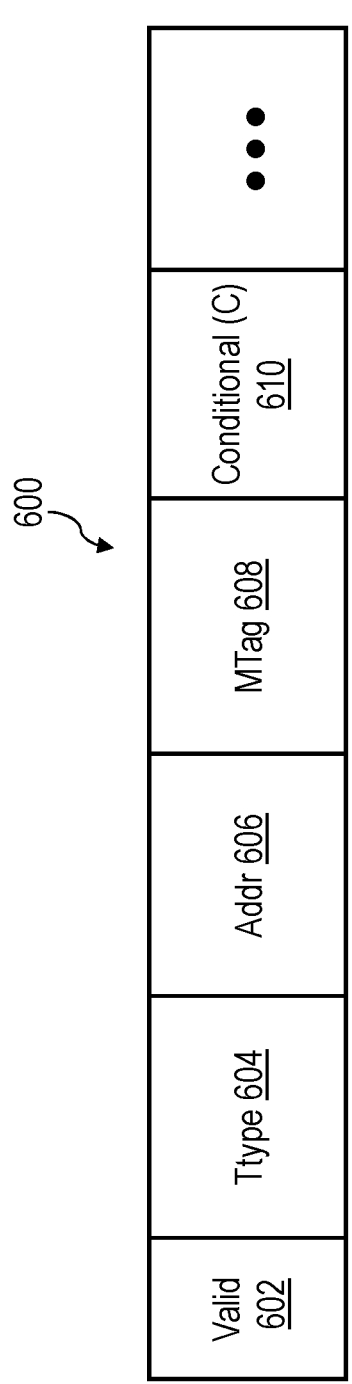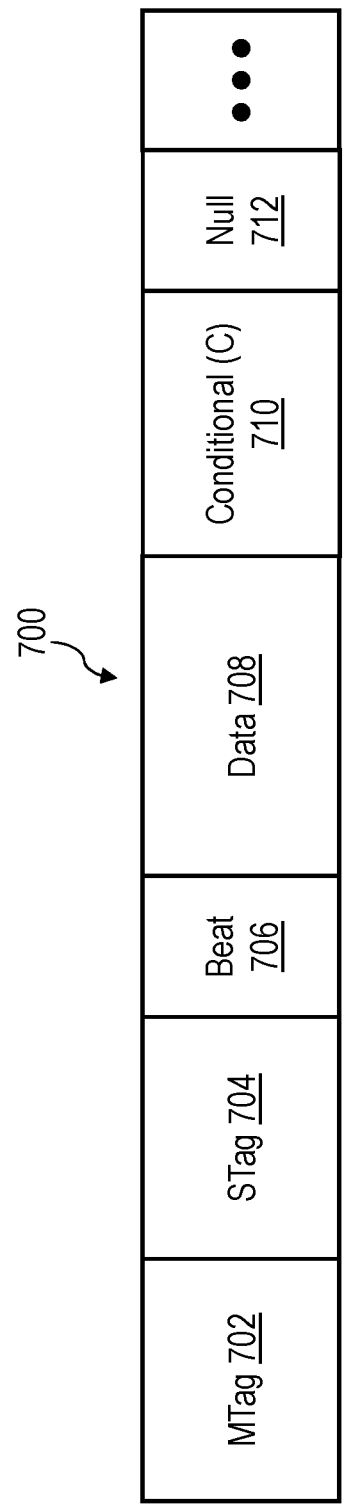
FIG. 6
FIG. 7

SPECULATIVE DELIVERY OF DATA FROM A LOWER LEVEL OF A MEMORY HIERARCHY IN A DATA PROCESSING SYSTEM

BACKGROUND

The present invention relates to data processing and, more particularly, to improving data processing system performance by decreasing data access latency by providing speculative delivery of data from a lower level of a memory hierarchy of a data processing system.

A conventional symmetric multiprocessor (SMP) computer system, such as a server computer system, includes multiple processing units all coupled to a system interconnect, which typically comprises one or more address, data, and control buses. Coupled to the system interconnect is a system memory, which represents the lowest level of shared memory in the multiprocessor computer system and which generally is accessible for read and write access by all processing units. In order to reduce access latency to instructions and data residing in the system memory, each processing unit is typically further supported by a respective multi-level vertical cache hierarchy, the lower level(s) of which may be shared by one or more processor cores.

Because multiple processor cores may request write access to a same memory block (e.g., cache line or sector) and because cached memory blocks that are modified are not immediately synchronized with system memory, the cache hierarchies of multiprocessor computer systems typically implement a cache coherence protocol to ensure at least a minimum required level of coherence among the various processor core's "views" of the contents of system memory. The minimum required level of coherence is determined by the selected memory consistency model, which defines rules for the apparent ordering and visibility of updates to the distributed shared memory. In all memory consistency models in the continuum between weak consistency models and strong consistency models, cache coherency requires, at a minimum, that after a processing unit accesses a copy of a memory block and subsequently accesses an updated copy of the memory block, the processing unit cannot again access the old ("stale") copy of the memory block.

A cache coherence protocol typically defines a set of coherence states stored in association with cached copies of memory blocks, as well as the events triggering transitions between the coherence states and the coherence states to which transitions are made. Coherence protocols can generally be classified as directory-based or snoop-based protocols. In directory-based coherence protocols, a common central directory maintains coherence by controlling accesses to memory blocks by the caches and by updating or invalidating copies of the memory blocks held in the various caches. Snoop-based coherence protocols, on the other hand, implement a distributed design paradigm in which each cache maintains a private directory of its contents, monitors ("snoops") the system interconnect for memory access requests targeting memory blocks held in the cache, and responds to the memory access requests by updating its private directory, and if required, by transmitting coherence message(s) and/or its copy of the memory block.

The cache states of the coherence protocol can include, for example, those of the well-known MESI (Modified, Exclusive, Shared, Invalid) protocol or a variant thereof. The MESI protocol allows a cache line of data to be associated with one of four states: "M" (Modified), "E" (Exclusive), "S" (Shared), or "I" (Invalid). The Modified state indicates that a memory block is valid only in the cache holding the Modified memory block and that the memory block is not consistent with system memory. The Exclusive state indicates that the associated memory block is consistent with system memory and that the associated cache is the only cache in the data processing system that holds the associated memory block. The Shared state indicates that the associated memory block is resident in the associated cache and possibly one or more other caches and that all of the copies of the memory block are consistent with system memory. Finally, the Invalid state indicates that the data and address tag associated with a coherency granule are both invalid.

In snoop-based coherence protocols, it is common for caches to respond to a request snooped on the interconnect by providing an individual coherence response. These individual coherence responses are then combined or otherwise processed to determine a final systemwide coherence response for the request, which can indicate, for example, whether or not the request will be permitted to succeed or will have to be retried, a data source responsible for supplying to the requesting cache a target cache line of data identified in the request, a coherence state of the target cache line at one or more caches following the request, etc. In a conventional data processing system employing a snoop-based coherence protocol, the minimum handoff interval at which a cache line of data can be sourced (intervened) from a cache in a vertical cache hierarchy supporting one processor core to another cache in a different vertical cache hierarchy supporting another processor core via the system interconnect is the time between when a request is issued by a cache and the systemwide coherence response is received by that cache.

In prior art SMP computer systems, only cache lines held in coherence states (such as the Modified state) designating those cache lines as unique can be intervened by a source cache memory to a requesting cache memory in advance of receipt by the source cache memory of the systemwide coherence response; cache lines held in other coherence states (e.g., the Shared state) can only be intervened by a source cache memory to a requesting cache memory after receipt by the source cache memory of a systemwide coherence response designating the source cache memory as the data source. Similarly, in prior art SMP computer systems, a system memory can only serve as a data source for a requested cache line of data if the systemwide coherence response designates the system memory as the data source. Further, regardless of whether a cache line of data is sourced by the data source before or after its receipt of the systemwide coherence response, each read-type memory access request is served by only a single data source.

BRIEF SUMMARY

According to at least one embodiment, data access latency in a multiprocessor data processing system is reduced by enabling a system memory or an associated lower level cache to source data requested by a snooped read-type memory access request prior to receipt of a systemwide coherence response by the data source.

According to at least one embodiment, data access latency in a multiprocessor data processing system is reduced by enabling multiple memory devices, including a system memory or associated lower level cache, to act as data sources for a given read-type memory access request.

In at least one embodiment, a multiprocessor data processing system includes multiple vertical cache hierarchies supporting a plurality of processor cores, a system memory, and an interconnect fabric coupled to the system memory and the multiple vertical cache hierarchies. Based on a request of a requesting processor core among the plurality of processor cores, a master in the multiprocessor data processing system issues, via the interconnect fabric, a read-type memory access request. The master receives via the interconnect fabric at least one beat of conditional data issued speculatively on the interconnect fabric by a controller of the system memory prior to receipt by the controller of a systemwide coherence response for the read-type memory access request. The master forwards the at least one beat of conditional data to the requesting processor core.

BRIEF DESCRIPTION OF THE SEVERAL VIEWS OF THE DRAWINGS

FIG. 6 depicts an exemplary memory access request on the system fabric of a data processing system in accordance with one embodiment;

FIG. 7 illustrates an exemplary data beat on the system fabric of a data processing system in accordance with one embodiment;

DETAILED DESCRIPTION

Figure 1:
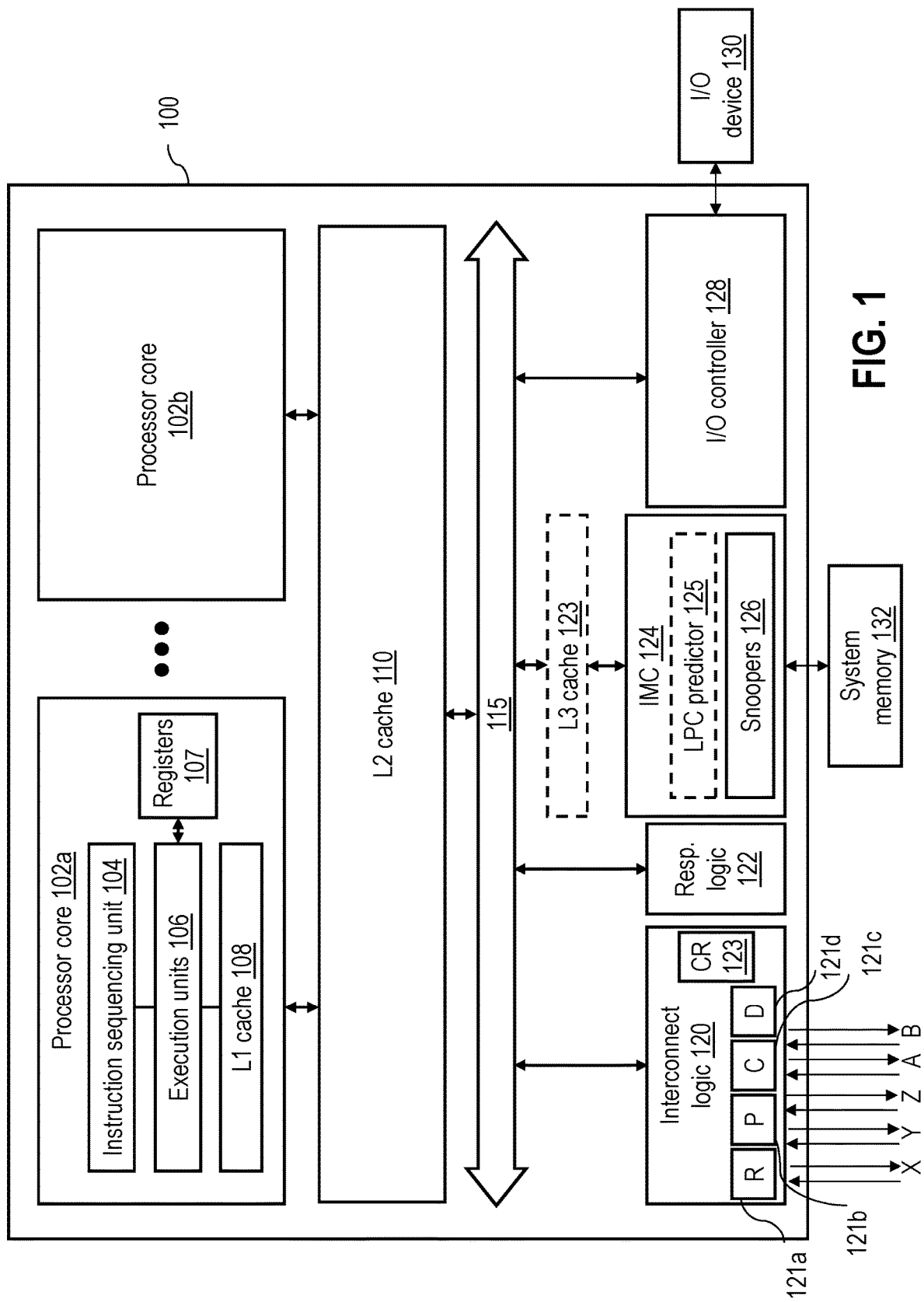
FIG. 1 is a diagram of a relevant portion of a processing unit in accordance with one embodiment.

With reference now to the figures and, in particular, with reference to FIG. 1, there is illustrated a high-level block diagram of an exemplary embodiment of a processing unit 100 of a multiprocessor data processing system in accordance with one embodiment. In the depicted embodiment, processing unit 100 is a single integrated circuit including two or more processor cores 102a, 102b for independently processing instructions and data. (Of course, in other embodiments, the number of processor cores 102 may vary.) Each processor core 102 includes an instruction sequencing unit (ISU) 104 for fetching and ordering instructions for execution and one or more execution units 106 for executing instructions. For example, execution units 106 may include one or more floating-point units (FPUs), one or more load-store units (LSUs), and one or more integer units (IUs), etc. The instructions executed by execution units 106 may include, for example, fixed- and floating-point arithmetic instructions, logical instructions, and instructions that request read and/or write access to a memory block. Execution units 106 are coupled to registers 107, which temporarily buffer, among other data, source operands and destination operands of instructions executed by execution units 106.

The operation of each processor core 102 is supported by a multi-level memory hierarchy having at its lowest level one or more shared system memories 132 (only one of which is shown in FIG. 1). Each system memory 132 is controlled by an associated integrated memory controller (IMC) 124, which controls read and write access to the system memory 132 in response to operations snooped by snoopers 126 on an interconnect fabric (described below) that includes a local bus 115 within processing unit 100. IMC 132 may optionally implement an LPC predictor 125, which, as described further below with respect to FIG. 14, may be utilized to determine whether or not IMC 132 (or an associated L3 cache, if implemented) will speculatively source data based on a snooped read-type memory access request that permits such conditional data to be provided.

The multi-level memory hierarchy additionally includes, at its upper levels, a vertical cache memory hierarchy including one or more levels of cache memory. In the illustrative embodiment, the vertical cache memory hierarchy of a processing unit 100 includes a store-through level one (L1) cache 108 within each processor core 102a and a level two (L2) cache 110 shared by all processor cores 102 of the processing unit 100. (In other embodiments, each processor core 102 may have its own private L2 cache 110.) Although the illustrated cache hierarchy includes only two levels of cache memory, those skilled in the art will appreciate that alternative embodiments may include additional levels (e.g., level three (L3), level four (L4), etc.) of on-chip or off-chip in-line or look-aside cache, which may be fully inclusive, partially inclusive, or non-inclusive of the contents the upper levels of cache. For example, FIG. 1 depicts an example in which an optional L3 cache 123 may be interposed between local bus 115 and IMC 124. In the illustrated embodiment, L3 cache 123 only caches copies of memory blocks corresponding to those stored in the associated system memory 132. In other embodiments, L3 cache 123 can alternatively be configured as a general last-level cache that caches copies of memory blocks corresponding to those stored in any of system memories 132. Those skilled in the art will appreciate from the following discussion those modifications to the disclosed embodiments that would be necessary or desirable if L3 cache 123 were instead configured to serve as a general last-level cache.

As further shown in FIG. 1, processing unit 100 includes integrated interconnect logic 120 by which local bus 115 of processing unit 100 may be coupled to form a portion of the interconnect fabric of a larger multiprocessor data processing system. In the depicted embodiment, interconnect logic 120 supports an arbitrary number t1 of "first tier" interconnect links, which in this case include in-bound and outbound 'X', 'Y' and 'Z' links. Interconnect logic 120 further supports an arbitrary number t2 of second tier links, designated in FIG. 1 as in-bound and out-bound 'A' and 'B' links. With these first and second tier links, each processing unit 100 may be coupled for bi-directional communication to up to t1/2+t2/2 (in this case, five) other processing units 100. Interconnect logic 120 includes request logic (labeled 'R') 121a, partial response logic (labeled 'P') 121b, combined response logic (labeled 'C') 121c and data logic (labeled 'D') 121d for processing and forwarding information during different phases of operations on the interconnect. In addition, interconnect logic 120 includes a configuration register (labeled 'CR') 123 including a plurality of mode bits utilized to configure processing unit 100. These mode bits preferably include: (1) a first set of one or more mode bits that selects a desired link information allocation for the first and second tier links; (2) a second set of mode bits that specify which of the first and second tier links of the processing unit 100 are connected to other processing units 100; and (3) a third set of mode bits that determines a programmable duration of a protection window extension.

Each processing unit 100 further includes an instance of response logic 122, which implements a portion of a distributed snoop-based coherency signaling mechanism that maintains cache coherency between the cache hierarchy of processing unit 100 and those of other processing units 100. Finally, each processing unit 100 includes an integrated I/O (input/output) controller 128 supporting the attachment of one or more I/O devices, such as I/O device 130. I/O controller 128 may issue operations and receive data on the 'X', 'Y', 'Z', 'A', and 13' links in response to requests by I/O device 130.

Figure 2:
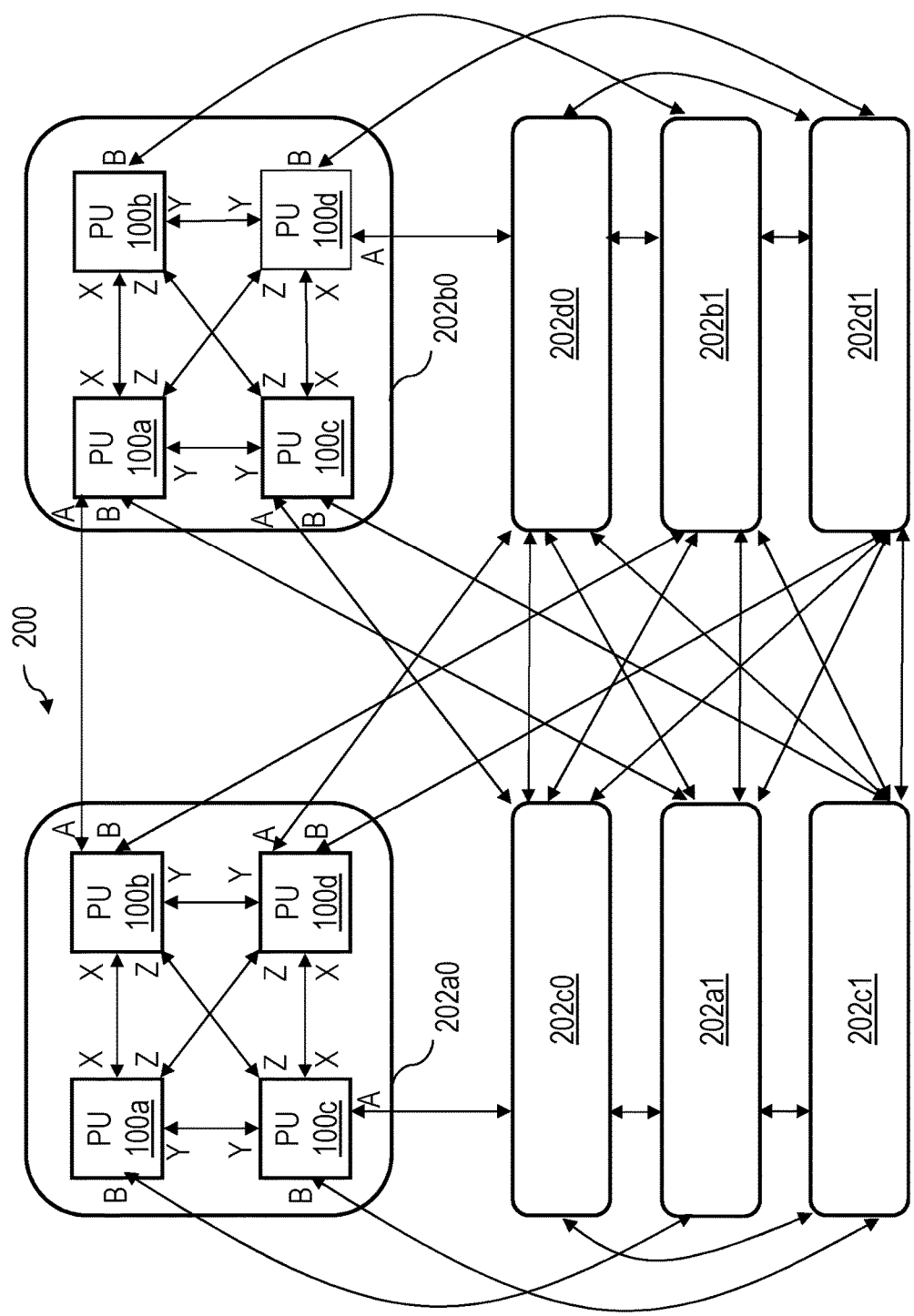
FIG. 2 is a diagram of a relevant portion of an exemplary data processing system in accordance with one embodiment.

Referring now to FIG. 2, there is depicted a block diagram of an exemplary embodiment of a data processing system 200 including multiple processing units 100 in accordance with the present invention. As shown, data processing system 200 includes eight processing nodes 202a0-202d0 and 202a1-202d1, which may each be realized as a multi-chip module (MCM) comprising a package containing four processing units 100. The processing units 100 within each processing node 202 are coupled for point-to-point communication by the processing units' 'X', 'Y', and 'Z' links, as shown. Each processing unit 100 may be further coupled to processing units 100 in two different processing nodes 202 for point-to-point communication by the processing units' 'A' and 'B' links. Although illustrated in FIG. 2 with a double-headed arrow, it should be understood that each pair of 'X', 'Y', 'Z', 'A', and 'B' links are preferably (but not necessarily) implemented as two uni-directional links, rather than as a bi-directional link.

General expressions for forming the topology shown in FIG. 2 can be given as follows:

Node[I][K].chip[J].link[K] connects to Node[J][K].chip [I].link[K], for all I≠J; and Node[I][K].chip[I].link[K] connects to Node[I][not K].chip[I].link[not K]; and Node[I][K].chip[I].link[not K] connects either to:
(1) Nothing (is reserved for future expansion); or
(2) Node[extra][not K].chip[I].link[K], in case in which all links are fully utilized (i.e., nine 8-way nodes forming a 72-way system); and
where I and J belong to the set {a, b, c, d} and K belongs to the set {0,1}.

Of course, alternative expressions can be defined to form other functionally equivalent topologies. Moreover, it should be appreciated that the depicted topology is representative but not exhaustive of data processing system topologies in which the present invention is implemented and that other topologies are possible. In such alternative topologies, for example, the number of first tier and second tier links coupled to each processing unit 100 can be an arbitrary number, and the number of processing nodes 202 within each tier (i.e., I) need not equal the number of processing units 100 per processing node 100 (i.e., J).

Those skilled in the art will appreciate that SMP data processing system 200 can include many additional unillustrated components, such as interconnect bridges, non-volatile storage, ports for connection to networks or attached devices, etc. Because such additional components are not necessary for an understanding of the present invention, they are not illustrated in FIG. 2 or discussed further herein.

Figure 3:
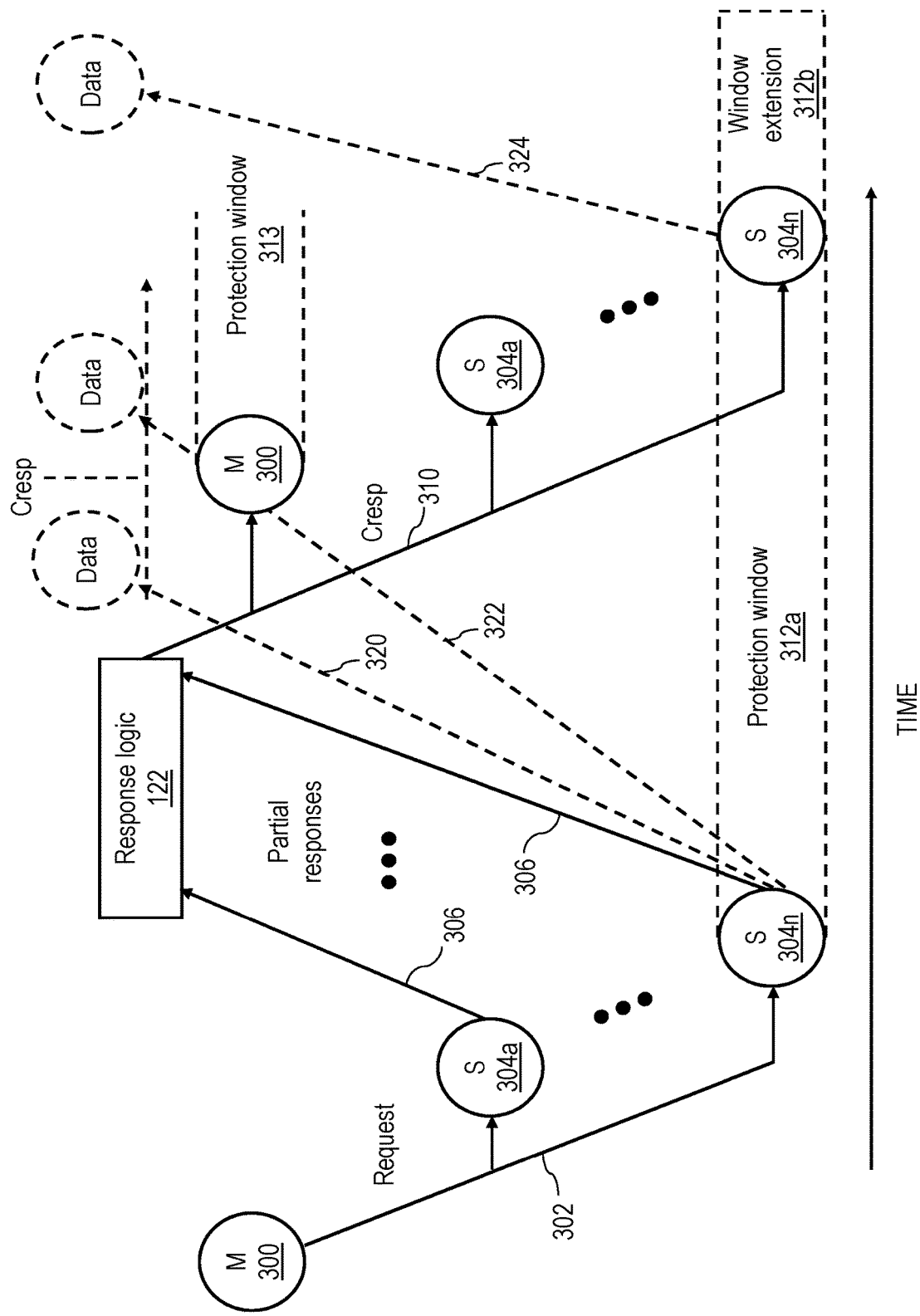
FIG. 3 is a time-space diagram of an exemplary operation including a request phase, a partial response (Presp) phase, and a combined response (Cresp) phase implemented within the data processing system of FIG. 2.

Referring now to FIG. 3, there is depicted a time-space diagram of an exemplary interconnect operation on the interconnect fabric of data processing system 200 of FIG. 2. The interconnect operation begins when a master 300 (e.g., a read-claim (RC) machine 512 of an L2 cache 110 (see, e.g., FIG. 5) or a master within an I/O controller 128) issues a request 302 on the interconnect fabric. Request 302 preferably includes at least a transaction type indicating a type of desired access and a resource identifier (e.g., target real address) indicating a resource to be accessed by the request. Common types of requests include those set forth below in Table I.

TABLE 1

| Request | Description |
|---|---|
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 302 is received by snoopers 304 (e.g., snoop machines 511 of L2 caches 110 (see, e.g., FIG. 5) and snoopers 126 of IMCs 124) distributed throughout data processing system 200. In general, with some exceptions, snoopers 304 in the same L2 cache 110 as the master 300 of request 302 do not snoop request 302 (i.e., there is generally no self-snooping) because a request 302 is transmitted on the interconnect fabric only if the request 302 cannot be serviced internally by a processing unit 100. Snoopers 304 that receive and process requests 302 each provide a respective partial response (Presp) 306 representing the response of at least that snooper 304 to request 302. A snooper 126 within an IMC 124 determines the partial response 306 to provide based, for example, upon whether the snooper 126 is responsible for the request address and whether it has resources available to service the request. An L2 cache 110 may determine its partial response 306 based on, for example, the availability of a snoop machine 511 to handle the request, the availability of its L2 cache directory 508 (see, e.g., FIG. 5), and the coherency state associated with the target real address in L2 cache directory 508.

The partial responses 306 of snoopers 304 are logically combined either in stages or all at once by one or more instances of response logic 122 to determine a system-wide combined response (Cresp) 310 to request 302. In one embodiment, which is assumed hereinafter, the instance of response logic 122 responsible for generating Cresp 310 is located in the processing unit 100 containing the master 300 that issued request 302. Response logic 122 provides Cresp 310 to master 300 and snoopers 304 via the interconnect fabric to indicate the system-wide coherence response (e.g., success, failure, retry, etc.) to request 302. If Cresp 310 indicates success of request 302, Cresp 310 may indicate, for example, a data source for a target memory block of request 302, a coherence state in which the requested memory block is to be cached by master 300 (or other caches), and whether "cleanup" operations invalidating the requested memory block in one or more caches are required.

In response to receipt of Cresp 310, one or more of master 300 and snoopers 304 typically perform one or more additional actions in order to service request 302. These additional actions may include supplying data to master 300, invalidating or otherwise updating the coherence state of data cached in one or more L2 caches 110, performing castout operations, writing back data to a system memory 132, etc. If required by request 302, a requested or target memory block may be transmitted to or from master 300 before or after the generation of Cresp 310 by response logic 122.

In the following description, the partial response 306 of a snooper 304 to a request 302 and the actions performed by the snooper 304 in response to the request 302 and/or its combined response 310 will be described with reference to whether that snooper is a Highest Point of Coherency (HPC), a Lowest Point of Coherency (LPC), or neither with respect to the request (target) address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 124 for the system memory 132 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 110. Although other indicators may be utilized to designate an HPC for a memory block, a preferred embodiment of the present invention designates the HPC, if any, for a memory block utilizing selected cache coherency state(s) within the cache directory of an L2 cache 110.

Still referring to FIG. 3, the HPC, if any, for a memory block referenced in a request 302, or in the absence of an HPC, the LPC of the memory block, preferably has the responsibility of protecting the transfer of coherence ownership of a memory block, if necessary, in response to a request 302. In the exemplary scenario shown in FIG. 3, a snooper 304n at the HPC (or in the absence of an HPC, the LPC) for the memory block specified by the request address of request 302 protects the transfer of coherence ownership of the requested (target) memory block to master 300 during a protection window 312a that extends from the time that snooper 304n determines its partial response 306 until snooper 304n receives Cresp 310 and during a subsequent window extension 312b extending a programmable time beyond receipt by snooper 304n of Cresp 310. During protection window 312a and window extension 312b, snooper 304n protects the transfer of coherence ownership of the target memory block from snooper 304n to mater 300 by providing partial responses 306 (e.g., retry partial responses) to other requests specifying the same request address. Such partial responses 306 prevent other masters from obtaining coherence ownership of the target memory block until coherence ownership has been successfully transferred from snooper 304n to master 300. If necessary, following receipt of combined response 310, master 300 may likewise initiate a protection window 313 to protect its acquisition of coherence ownership of the target memory block. Protection window 313 ensures that any master subsequently requesting the target memory block will receive any new value of the target memory block created by master 300 rather than a stale value.

Because snoopers 304 all have limited resources for handling the CPU and I/O requests described above, several different levels of partial responses and corresponding Cresps are possible. For example, if a snooper 126 within a memory controller 124 that is responsible for a requested memory block has a queue available to handle a request, the snooper 126 may respond with a partial response indicating that it is able to serve as the LPC for the request. If, on the other hand, the snooper 126 has no queue available to handle the request, the snooper 126 may respond with a partial response indicating that it is the LPC for the memory block, but is unable to currently service the request. Similarly, an L2 cache 110 may require an available snoop machine 511 and access to L2 cache directory 508 in order to handle a request. Absence of access to either (or both) of these resources results in a partial response (and corresponding Cresp) signaling an inability to service the request due to absence of a required resource.

As is further illustrated in FIG. 3, a snooper 304n within an L2 cache 110 may return data (e.g., for a read-type memory access request, such as a READ or RWITM request) to master 300 (e.g., another L2 cache 110) before or after master 300 receives the Cresp (for the READ or RWITM request) from response logic 122. A snooper 304n within an L2 cache 110 can source data before the snooper 304n receives Cresp 310 if the L2 cache 110 holds the requested data in a coherence state uniquely designating the L2 cache 110 as the data source for the requested data, as shown at reference numerals 320 and 322. If the L2 cache 110 does not hold the requested data in a coherence state uniquely designating the L2 cache 110 as the data source for the requested data, snooper 304n within the L2 cache 110 may source the requested data after receipt of Cresp 310, as shown at reference numeral 324. If no L2 cache 110 is able to intervene the requested data, a snooper 304n that is one of snoopers 126 in IMC 124 can serve as a data source of the requested data following receipt by IMC 124 of Cresp 310, as shown at reference numeral 324. In accordance with the present disclosure, under certain conditions, a snooper 304n that is one of snoopers 126 in IMC 124 can also serve as a data source for speculative and possibly stale data (i.e., "conditional" data) prior to its receipt of Cresp 310, regardless of whether another snooper 304 within an L2 cache 110 will also intervene the requested data.

Figure 4:
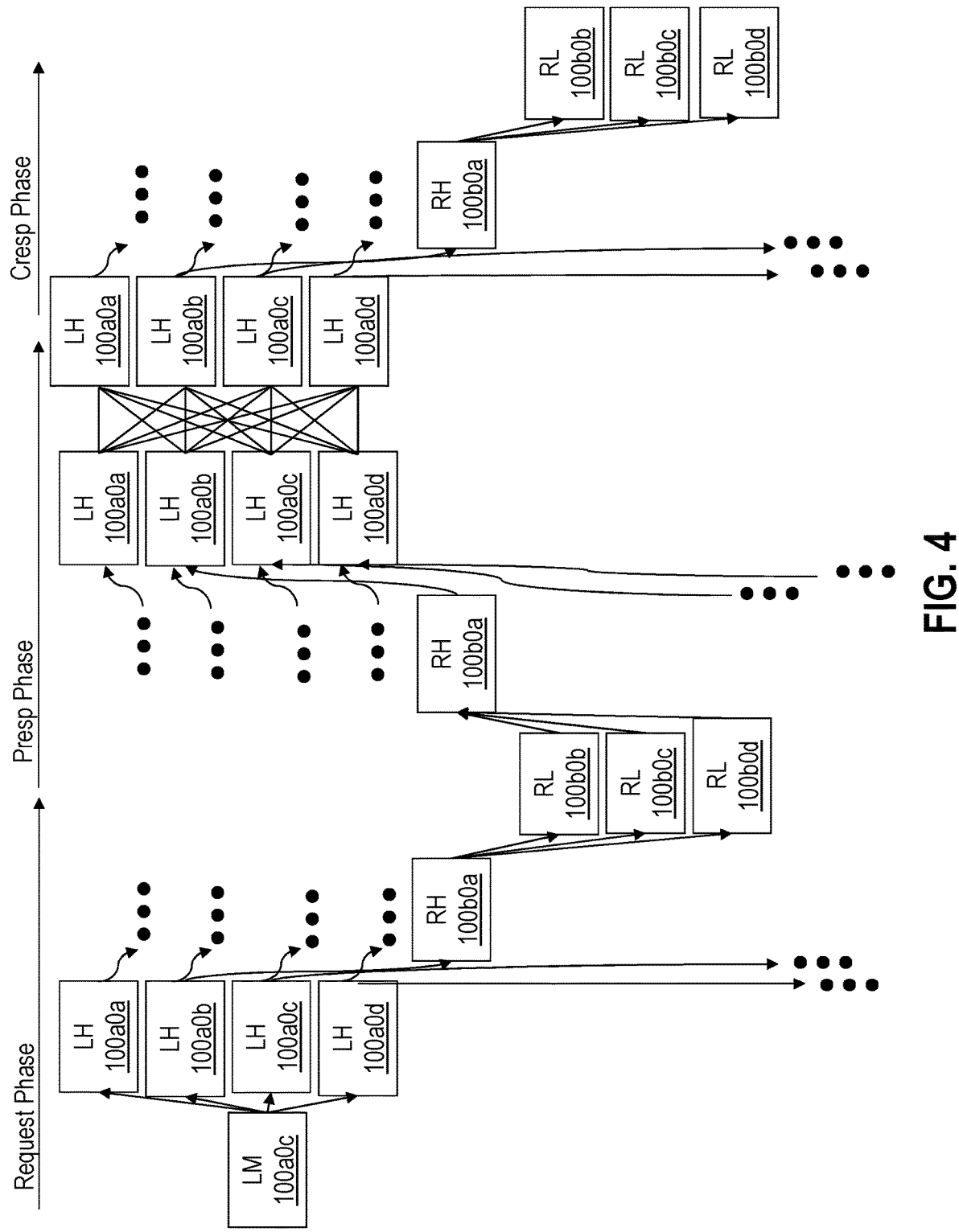
FIG. 4 is a time-space diagram of an exemplary operation within the data processing system of FIG. 2.

Referring now to FIG. 4, there is illustrated a time-space diagram of an exemplary operation flow in data processing system 200 of FIG. 2. In these figures, the various processing units 100 within data processing system 200 are tagged with two locational identifiers—a first identifying the processing node 202 to which the processing unit 100 belongs and a second identifying the particular processing unit 100 within the processing node 202. Thus, for example, processing unit 100a0c refers to processing unit 100c of processing node 202a0. In addition, each processing unit 100 is tagged with a functional identifier indicating its function relative to the other processing units 100 participating in the operation. These functional identifiers include: (1) local master (LM), which designates the processing unit 100 that originates the operation, (2) local hub (LH), which designates a processing unit 100 that is in the same processing node 202 as the local master and that is responsible for transmitting the operation to another processing node 202 (a local master can also be a local hub), (3) remote hub (RH), which designates a processing unit 100 that is in a different processing node 202 than the local master and that is responsible to distribute the operation to other processing units 100 in its processing node 202, and (4) remote leaf (RL), which designates a processing unit 100 that is in a different processing node 202 from the local master and that is not a remote hub.

As shown in FIG. 4, the exemplary operation has at least three phases as described above with reference to FIG. 3, namely, a request (or address) phase, a partial response (Presp) phase, and a combined response (Cresp) phase. These three phases preferably occur in the foregoing order and do not overlap. The operation may additionally have a data phase, which may optionally overlap with any of the request, partial response and combined response phases.

Still referring to FIG. 4, the request phase begins when a local master 100a0c (i.e., processing unit 100c of processing node 202a0) performs a synchronized broadcast of a request, for example, a read request, to each of the local hubs 100a0a, 100a0b, 100a0c and 100a0d within its processing node 202a0. It should be noted that the list of local hubs includes local hub 100a0c, which is also the local master. This internal transmission may be advantageously employed to synchronize the operation of local hub 100a0c with local hubs 100a0a, 100a0b and 100a0d so that the timing constraints can be more easily satisfied.

In response to receiving the request, each local hub 100 that is coupled to a remote hub 100 by its 'A' or 'B' links transmits the operation to its remote hub(s) 100. Thus, local hub 100a0a makes no transmission of the operation on its outbound 'A' link, but transmits the operation via its outbound 'B' link to a remote hub within processing node 202a1. Local hubs 100a0b, 100a0c and 100a0d transmit the operation via their respective outbound 'A' and 'B' links to remote hubs in processing nodes 202b0 and 202b1, processing nodes 202c0 and 202c1, and processing nodes 202d0 and 202d1, respectively. Each remote hub 100 receiving the operation, in turn, transmits the operation to each remote leaf 100 in its processing node 202. Thus, for example, remote hub 100b0a transmits the operation to remote leaves 100b0b, 100b0c and 100b0d. In this manner, the operation is efficiently broadcast to all processing units 100 within data processing system 200 utilizing transmission over no more than three links.

Following the request phase, the partial response (Presp) phase occurs. In the partial response phase, each remote leaf 100 evaluates the operation and provides its partial response to the operation to its respective remote hub 100. For example, remote leaves 100b0b, 100b0c and 100b0d transmit their respective partial responses to remote hub 100b0a. Each remote hub 100 in turn transmits these partial responses, as well as its own partial response, to a respective one of local hubs 100a0a, 100a0b, 100a0c and 100a0d. Local hubs 100a0a, 100a0b, 100a0c and 100a0d then broadcast these partial responses, as well as their own partial responses, to each local hub 100 in processing node 202a0. It should be noted that the broadcast of partial responses by the local hubs 100 within processing node 202a0 includes, for timing reasons, the self-broadcast by each local hub 100 of its own partial response.

As will be appreciated, the collection of partial responses in the manner shown can be implemented in a number of different ways. For example, it is possible to communicate an individual partial response back to each local hub from each other local hub, remote hub and remote leaf. Alternatively, for greater efficiency, it may be desirable to accumulate partial responses as they are communicated back to the local hubs. In order to ensure that the effect of each partial response is accurately communicated back to local hubs 100, it is preferred that the partial responses be accumulated, if at all, in a non-destructive manner, for example, utilizing a logical OR function and an encoding in which no relevant information is lost when subjected to such a function (e.g., a "one-hot" encoding).

As further shown in FIG. 4, response logic 122 at each local hub 100 within processing node 202a0 compiles the partial responses of the other processing units 100 to obtain a combined response representing the system-wide coherence response to the request. Local hubs 100a0a-100a0d then broadcast the combined response to all processing units 100 following the same paths of distribution as employed for the request phase. Thus, the combined response is first broadcast to remote hubs 100, which in turn transmit the combined response to each remote leaf 100 within their respective processing nodes 202. For example, local hub 100a0b transmits the combined response to remote hub 100b0a, which in turn transmits the combined response to remote leaves 100b0b, 100b0c and 100b0d.

As noted above, servicing the operation may require an additional data phase. For example, if the operation is a read-type operation, such as a READ or RWITM operation, remote leaf 100b0d may source the requested memory block to local master 100a0c via the links connecting remote leaf 100b0d to remote hub 100b0a, remote hub 100b0a to local hub 100a0b, and local hub 100a0b to local master 100a0c. Conversely, if the operation is a write-type operation, for example, a cache castout operation writing a modified memory block back to the system memory 132 of remote leaf 100b0b, the memory block is transmitted via the links connecting local master 100a0c to local hub 100a0b, local hub 100a0b to remote hub 100b0a, and remote hub 100b0a to remote leaf 100b0b.

Of course, the scenario depicted in FIG. 4 is merely exemplary of the myriad of possible operations that may occur concurrently in a multiprocessor data processing system such as data processing system 200.

As described above with reference to FIG. 3, coherency is maintained during the "handoff" of coherency ownership of a memory block from a snooper 304n to a requesting master 300 in the possible presence of other masters competing for ownership of the same memory block through protection window 312a, window extension 312b, and protection window 313. For example, protection window 312a and window extension 312b must together be of sufficient duration to protect the transfer of coherency ownership of the requested memory block to a winning master (WM) 300 in the presence of a competing request by a competing master (CM). To ensure that protection window 312a and window extension 312b have sufficient duration to protect the transfer of ownership of the requested memory block to winning master 300, the latency of communication between processing units 100 in accordance with FIG. 4 is preferably constrained such that the following conditions are met:

$$A\_lat(CM\_S) < A\_lat(CM\_WM) + C\_lat(WM\_S) + \varepsilon,$$

where A_lat(CM_S) is the address latency of any competing master (CM) to the snooper (S) 304n owning coherence of the requested memory block, A_lat(CMWM) is the address latency of any competing master (CM) to the "winning" master (WM) 300 that is awarded coherency ownership by snooper 304n, C_lat(WM_S) is the combined response latency from the time that the combined response is received by the winning master (WM) 300 to the time the combined response is received by the snooper (S) 304n owning the requested memory block, and c is the duration of window extension 312b.

If the foregoing timing constraint, which is applicable to a system of arbitrary topology, is not satisfied, the request of the competing master may be received (1) by winning master 300 prior to winning master 300 assuming coherency ownership and initiating protection window 312b and (2) by snooper 304n after protection window 312a and window extension 312b end. In such cases, neither winning master 300 nor snooper 304n will provide a partial response to the competing request that prevents the competing master from assuming coherency ownership of the memory block and reading non-coherent data from memory. However, to avoid this coherency error, window extension 312b can be programmably set (e.g., by appropriate setting of configuration register (CR) 123) to an arbitrary length (c) to compensate for latency variations or the shortcomings of a physical implementation that may otherwise fail to satisfy the timing constraint that must be satisfied to maintain coherency. Thus, by solving the above equation for ε, the ideal length of window extension 312b for any implementation can be determined.

Several observations may be made regarding the foregoing timing constraint. First, the address latency from the competing master to the owning snooper 304a has no necessary lower bound, but must have an upper bound. The upper bound is designed for by determining the worst case latency attainable, given, among other things, the maximum possible oscillator drift, the longest links coupling processing units 100, the maximum number of accumulated stalls, and guaranteed worst case throughput. In order to ensure the upper bound is observed, the interconnect fabric must ensure non-blocking behavior.

Second, the address latency from the competing master to the winning master 300 has no necessary upper bound, but must have a lower bound. The lower bound is determined by the best case latency attainable, given, among other things, the absence of stalls, the shortest possible link between processing units 100 and the slowest oscillator drift given a particular static configuration. Although for a given operation, each of the winning master 300 and competing master has only one timing bound for its respective request, it will be appreciated that during the course of operation any processing unit 100 may be a winning master for some operations and a competing (and losing) master for other operations. Consequently, each processing unit 100 effectively has an upper bound and a lower bound for its address latency.

Third, the combined response latency from the time that the combined response is generated to the time the combined response is observed by the winning master 300 has no necessary lower bound (the combined response may arrive at the winning master 300 at an arbitrarily early time), but must have an upper bound. By contrast, the combined response latency from the time that a combined response is generated until the combined response is received by the snooper 304n has a lower bound, but no necessary upper bound (although one may be arbitrarily imposed to limit the number of operations concurrently in flight).

Fourth, there is no constraint on partial response latency. That is, because all of the terms of the timing constraint enumerated above pertain to request/address latency and combined response latency, the partial response latencies of snoopers 304 and competing master to winning master 300 have no necessary upper or lower bounds.

The first tier and second tier links connecting processing units 100 may be implemented in a variety of ways to obtain the topology depicted in FIG. 2 and to meet timing constraints. In one preferred embodiment, each inbound and outbound first tier ('X', 'Y', and 'Z') link and each inbound and outbound second tier ('A' and 13') link is implemented as a uni-directional 8-byte bus containing a number of different virtual channels or tenures to convey address, data, control and coherency information.

Figure 5:
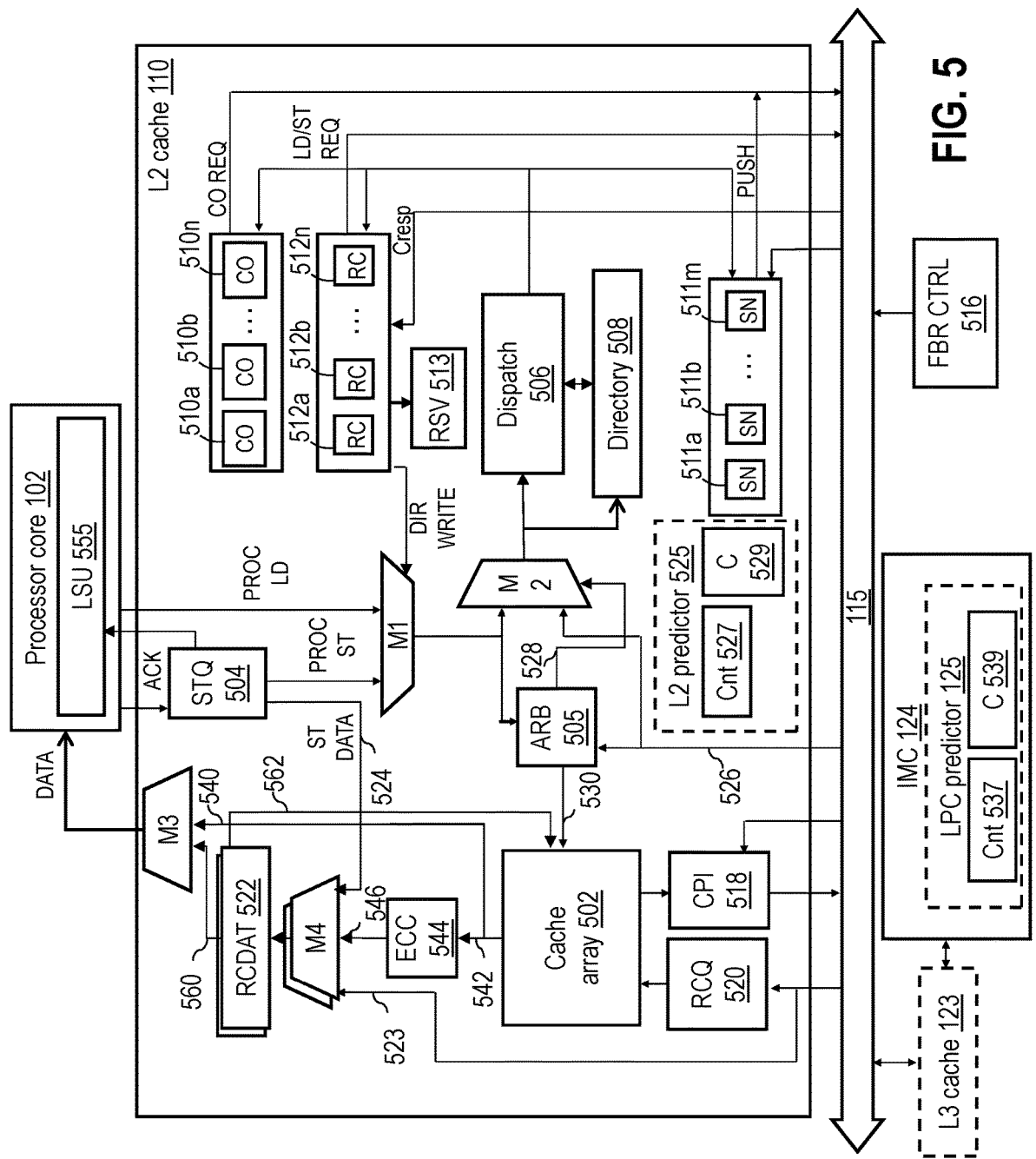
FIG. 5 is a more detailed block diagram of an L2 cache of FIG. 1 in accordance with one embodiment.

With reference now to FIG. 5, there is illustrated a more detailed block diagram of an exemplary L2 cache 110 in accordance with one embodiment. As shown in FIG. 5, L2 cache 110 includes a cache array 502 and a directory 508 of the contents of cache array 502. Although not explicitly illustrated, cache array 502 preferably is implemented with a single read port and a single write port to reduce the die area required to implement cache array 502.

Assuming cache array 502 and directory 508 are set-associative as is conventional, memory locations in system memory 132 are mapped to particular congruence classes within cache array 502 utilizing predetermined index bits within the system memory (real) addresses. The particular memory blocks stored within the cache lines of cache array 502 are recorded in cache directory 508, which contains one directory entry for each cache line. While not expressly depicted in FIG. 5, it will be understood by those skilled in the art that each directory entry in cache directory 508 includes various fields, for example, a tag field that identifies the real address of the memory block held in the corresponding cache line of cache array 502, a state field that indicate the coherence state of the cache line, and a least recently used (LRU) field indicating a replacement order for the cache line with respect to other cache lines in the same congruence class.

L2 cache 110 includes multiple (e.g., 16 or 32) read-claim (RC) machines 512a-512n for independently and concurrently servicing load (LD) and store (ST) requests received from the affiliated processor core 102. In addition, L2 cache 110 includes multiple (e.g., 16 or 32) snoop machines 511a-511m to service remote memory access requests originating from processor cores 102 other than the affiliated processor core 102. Each snoop machine 511 can independently and concurrently handle a remote memory access request "snooped" from local interconnect 514. As will be appreciated, the servicing of memory access requests by L2 cache 110 may require the replacement or invalidation of memory blocks within cache array 502. Accordingly, L2 cache 110 includes CO (castout) machines 510a-510n that manage the removal and writeback of memory blocks from cache array 502.

L2 cache 110 also includes an RC queue 520 and a CPI (castout push intervention) queue 518 that respectively buffer data being inserted into and removed from the cache array 502. RC queue 520 includes a number of buffer entries that each individually correspond to a particular one of RC machines 512 such that each RC machine 512 that is dispatched retrieves data from only the designated buffer entry. Similarly, CPI queue 518 includes a number of buffer entries that each individually correspond to a particular one of the castout machines 510 and snoop machines 511, such that each CO machine 510 and each snooper 511 that is dispatched retrieves data from only the respective designated CPI buffer entry.

Each RC machine 512 also has assigned to it a respective one of multiple RC data (RCDAT) buffers 522 for buffering a memory block read from cache array 502 and/or received from local interconnect 514 via reload bus 523. The RCDAT buffer 522 assigned to each RC machine 512 is preferably constructed with connections and functionality corresponding to the memory access requests that may be serviced by the associated RC machine 512. At least some of RCDAT buffers 522 have an associated store data multiplexer M4 that selects data bytes from among its inputs for buffering in the RCDAT buffer 522 in response unillustrated select signals generated by arbiter 505.

L2 cache 110 additionally includes an arbiter 505 configured to control multiplexers M1-M2 to order the processing of local memory access requests received from the affiliated processor core 102 and remote requests snooped on local interconnect 514. Memory access requests, including local load and store operations and remote read and write operations, are forwarded in accordance with the arbitration policy implemented by arbiter 505 to a dispatch pipeline 506 where each read/load and store request is processed with respect to directory 508 and cache array 502 over a given number of cycles.

L2 cache 110 additionally provides support for atomic updates by the associated processor core(s) 102 through the implementation of reservation logic 513, which tracks reservations established by atomic load (e.g., load-and-reserve (LARX)) requests to ensure that corresponding atomic store (e.g., store-conditional (STCX)) requests only complete successfully if the reserved cache lines have not been modified since the reservations were established (i.e., if the relevant reservation is still valid). In a typical embodiment, reservation logic 513 includes, for each thread, a respective reservation address register that specifies the base address of a cache line for which a reservation is established and a reservation flag indicating whether or not the reservation for the specified cache line is still valid.

In operation, processor store requests comprising a transaction type (ttype), target real address, and store data are received from the affiliated processor core 102 within a store queue (STQ) 504. From STQ 504, the store data are transmitted to store data multiplexer M4 via data path 524, and the store type and target address are passed to multiplexer M1. Multiplexer M1 also receives as inputs processor load requests from processor core 102 and directory write requests from RC machines 512. In response to unillustrated select signals generated by arbiter 505, multiplexer M1 selects one of its input requests to forward to multiplexer M2, which additionally receives as an input a remote request received from local interconnect 514 via remote request path 526. Arbiter 505 schedules local and remote memory access requests for processing and, based upon the scheduling, generates a sequence of select signals 528. In response to select signals 528 generated by arbiter 505, multiplexer M2 selects either the local request received from multiplexer M1 or the remote request snooped from local interconnect 514 as the next memory access request to be processed.

A request selected for processing by arbiter 505 is placed by multiplexer M2 into dispatch pipeline 506. Dispatch pipeline 506 preferably is implemented as a fixed duration pipeline in which each of multiple possible overlapping requests A, B, C, etc. is processed for a predetermined number of clock cycles. For example, dispatch pipeline 506 may process each request for four cycles.

During a first cycle of processing within dispatch pipeline 506, a 1-cycle directory read is performed utilizing the request address to determine if the request address hits or misses in directory 508, and if the memory address hits, the coherence state of the memory block within directory 508. The directory information, which includes a hit/miss indication and the coherence state of the memory block, is returned by directory 508 to dispatch pipeline 506 in a subsequent cycle, such as the fourth cycle. As will be appreciated, no action is generally taken within an L2 cache 110 in response to miss on a remote memory access request; such remote memory requests are accordingly discarded from dispatch pipeline 506. However, in the event of a hit or miss on a local memory access request or a hit on a remote memory access request, L2 cache 110 will service the memory access request, which for requests that cannot be serviced entirely within processing unit 100, may entail communication on local interconnect 514 via fabric controller 516.

At a predetermined time during processing of the memory access request within dispatch pipeline 506, arbiter 505 transmits the request address to cache array 502 via address and control path 530 to initiate a cache read of the memory block specified by the request address. A cache read takes 2 cycles in the exemplary embodiment. The memory block read from cache array 502 is transmitted via data path 542 to error correcting code (ECC) logic 544, which checks the memory block for errors and, if possible, corrects any detected errors. For processor load requests, the memory block is also transmitted to load data multiplexer M3 via data path 540 for forwarding to the affiliated processor core 102.

At the last cycle of the processing of a memory access request within dispatch pipeline 506, dispatch pipeline 506 make a dispatch determination. For example, dispatch pipeline 506 may make the dispatch determination based upon a number of criteria, including (1) the presence of an address collision between the request address and a previous request address currently being processed by a castout machine 510, snoop machine 511 or RC machine 512, (2) the directory information, and (3) availability of an RC machine 512 (for a local request of the affiliated processor core 102) or snoop machine 511 (for a snooped request of a remote processor core) to process the memory access request. If dispatch pipeline 506 makes a dispatch determination that the memory access request is to be dispatched, the memory access request is dispatched from dispatch pipeline 506 to an RC machine 512 or a snoop machine 511, as appropriate. If the memory access request fails dispatch, the failure is signaled to the requestor (e.g., local or remote processor core 102) by a retry response. The requestor may subsequently retry the failed memory access request, if necessary.

While an RC machine 512 is processing a local memory access request, the RC machine 512 has a busy status and is not available to service another request. While an RC machine 512 has a busy status, the RC machine 512 may perform a directory write to update the relevant entry of directory 508, if necessary. In addition, the RC machine 512 may perform a cache write to update the relevant cache line of cache array 502. A directory write and a cache write may be scheduled by arbiter 505 during any interval in which dispatch pipeline 506 is not already processing other requests according to the fixed scheduling of directory reads and cache reads. When all operations for the given request have been completed, the RC machine 512 returns to an unbusy state.

It will be appreciated that the scheduling of non-fixed-schedule operations such as directory writes and cache writes can impact the scheduling of other operations, including those processed according to a fixed schedule.

In some embodiments, L2 cache 110 may include an optional L2 predictor 525. As described further below with respect to blocks 806-808 of FIG. 8 and FIG. 12, L2 predictor 525 may be utilized to determine whether or not an RC machine 512 will issue on the system fabric a read-type memory access request that permits the relevant IMC 124 (or its associated L3 cache 123, if present) to supply conditional (i.e., speculative) data requested by the read-type memory access request.

Referring now to FIG. 6, there is depicted an exemplary read-type memory access request 600 in accordance with one embodiment. Read-type memory access request 600 may be issued on the system fabric of data processing system 200, for example, by an RC machine 512 of one of L2 caches 110.

As indicated, read-type memory access request 600 includes a valid field 602 indicating whether or not the remainder of the contents of read-type memory access request 600 is valid, a transaction type (ttype) field 604 identifying the specific type of the read-type request (e.g., READ or RWITM), an address field 606 specifying a target real address of a cache line of data to be read, and a master tag (MTag) field 608 uniquely identifying the master (e.g., RC machine 512) that issued read-type memory access request 600. In addition, read-type memory access request 600 includes a conditional (C) field 610 indicating whether or not the master that initiated read-type memory access request 600 on the system fabric will accept return of conditional (i.e., speculative) data from an IMC 124 (or its associated L3 cache 123, if present). It should be noted that any data returned by an L2 cache 110 in response to a read-type memory access request 600 is, by definition, non-conditional.

With reference now to FIG. 7, there is illustrated an exemplary embodiment of a data beat 700 issued on the system fabric of data processing system 200 in response to a read-type memory access request 600. Data beat 700 may be issued on the system fabric of data processing system 200, for example, by a SN machine 511 of one of L2 caches 110 or by an IMC 124 (or its associated L3 cache 123, if present). In a typical implementation, multiple data beats 700 are utilized to communicate a cache line of requested data from a data source to a requesting master.

In the illustrated example, data beat 700 includes a master tag (MTag) field 702 that uniquely identifies the master that issued the read-type memory access request 600 to which data beat 700 is responsive. In addition, data beat 700 includes a snooper tag (STag) field 704 that indicates the snooper that sourced data beat 700, for example, one of snoopers 511 in an L2 cache 110, one of snoopers 126 in IMC 124, or, if present, one of L3 caches 123. Because it is typical that the width of a cache line of requested data is an integer multiple N of the width of the data path provided by the system fabric and thus multiple beats on the system fabric are required to communicate the full cache line, data beat 700 also includes a beat field 706 providing a beat number (e.g., 0 to N−1) for data beat 700. Data beat 700 additionally includes a data field 708 providing a portion of the cache line of data requested by the associated read-type memory access request 600 and a conditional field 710 indicating whether or not data beat 700 is speculatively sourced by an IMC 124 (or its associated L3 cache 123, if present). Data beat 700 further includes a Null field 712 that, if set (e.g., to 1), indicates that no conditional data beats 700 will be transmitted on the system fabric by an IMC 124 (or its associated L3 cache 123, if present) in response to the corresponding read-type memory access request 600 because receipt of an appropriate Cresp by the IMC 124 has rendered such speculative data unnecessary.

Figure 8:
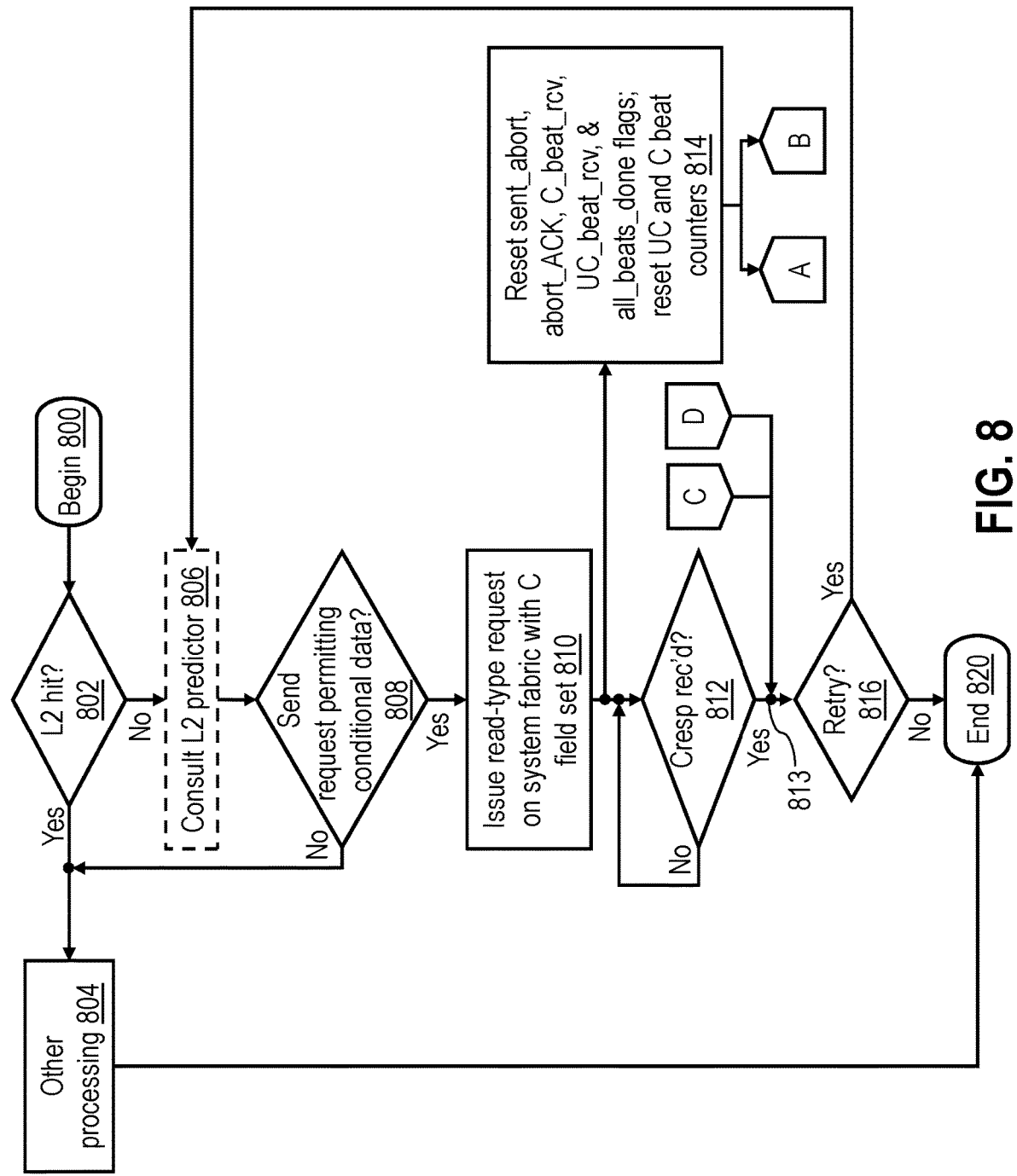
FIGS. 8-10 together form a high-level logical flowchart of a process by which a master issues a read-type memory access request on a system fabric of a data processing system and handles returned data in accordance with one embodiment.
Figure 9:
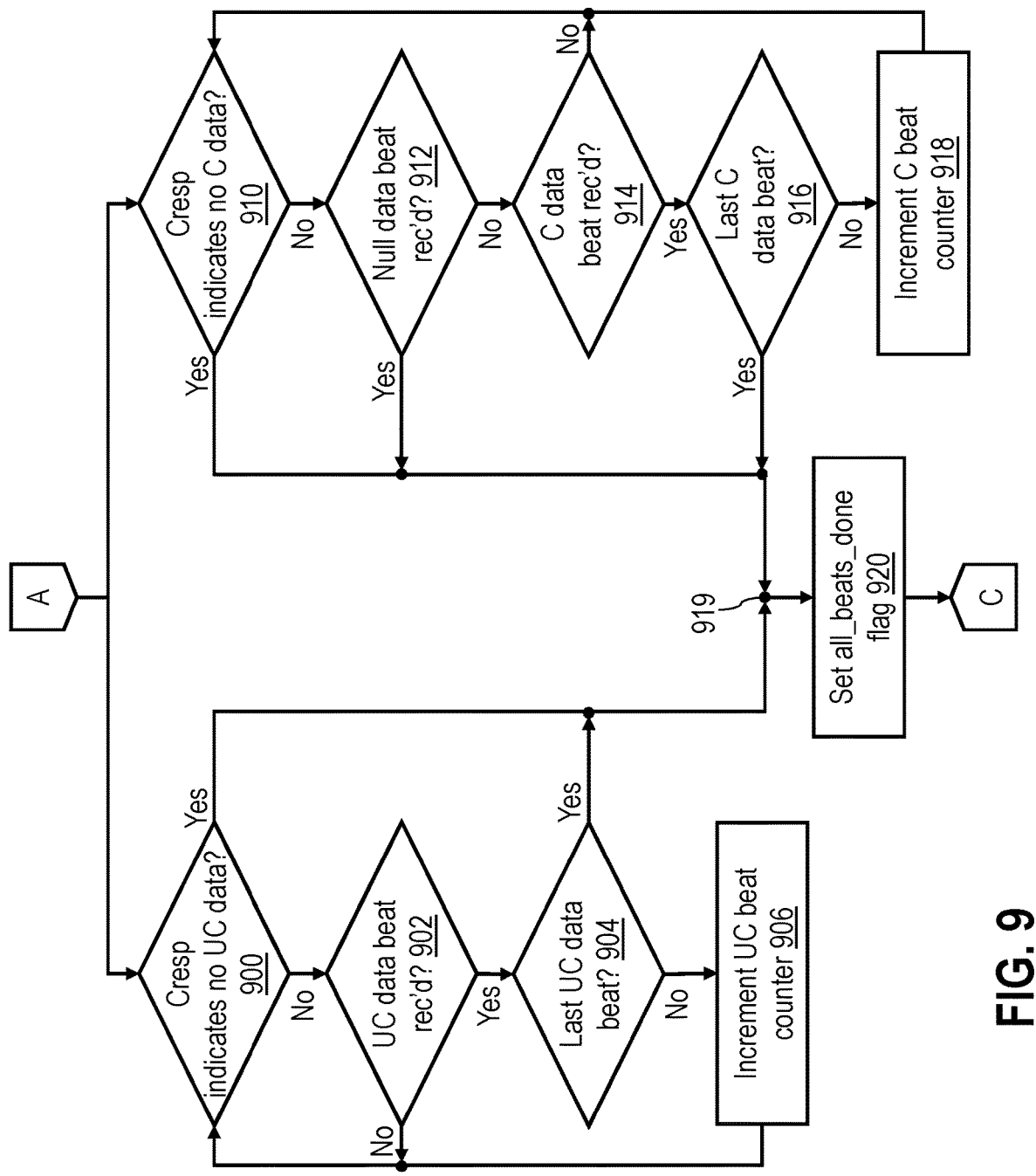
Figure 10:
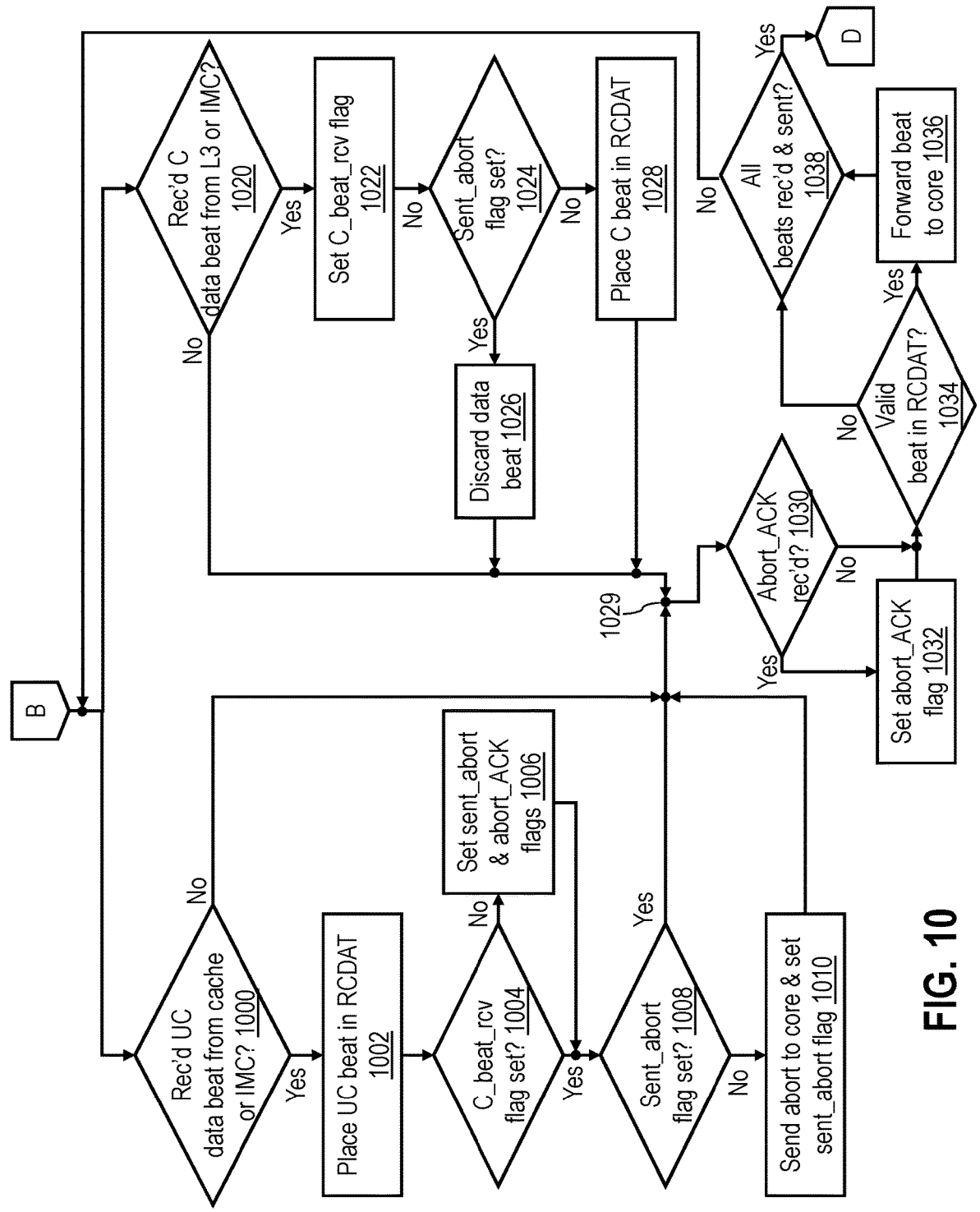

Referring now to FIGS. 8-10, a high-level logical flowchart of an exemplary process is illustrated by which a master (hereafter assumed to be an RC machine 512 of an L2 cache 110) issues a read-type memory access request 600 on the system fabric of a data processing system 200 and handles returned data in accordance with one embodiment. The process begins at block 800, for example, in response to receipt by an RC machine 512 of a read-type memory access request issued by an associated processor core 102, as described below with reference to block 1102 of FIG. 11. In response to receipt of the read-type memory access request, RC machine 512 determines whether the result of the lookup of the target real address of the read-type memory access request in the local directory 508 indicates a hit (block 802). If so, RC machine 512 services the read-type memory access request utilizing other processing 804, which may be entirely conventional. Thereafter, the process of FIG. 8 ends at block 820.

Returning to block 802, in response to a determination at block 802 that the target real address of the read-type memory access request missed in the local directory 508, the process passes directly to block 808 if optional L2 predictor 525 is omitted or, if L2 predictor 525 is implemented, passes to block 806. Block 806 illustrates RC machine 512 consulting L2 predictor 525 to determine whether or not to issue, on the system fabric, a read-type memory access request 600 that has conditional field 610 set to indicate that the requested cache line of data may be speculatively sourced by an IMC 124 (or its associated L3 cache 123, if present) prior to receipt of Cresp. One example of a process by which L2 predictor 525 determines whether or not to indicate that such conditional data is permitted is described in detail below with reference to FIG. 14. As indicated by block 808, if L2 predictor 525 indicates not to issue a read-type memory access request on the system fabric that permits conditional data, the process passes to block 804, and RC machine 512 services the read-type request of the processor core 102 utilizing other, possibly conventional processing. If, however, RC machine 512 determines at block 808 to issue a read-type memory access request on the system fabric that permits conditional data, whether based on L2 predictor 525 (if present) or simply based on the present capability of the associated processor core 102 to handle speculative read data, the process proceeds to block 810.

Block 810 depicts RC machine 512 issuing, on the system fabric of data processing system 200, a read-type memory access request 600. As discussed above, the read-type memory access request 600 includes a valid field 602 that is set to indicate the contents of the request 600 are valid, a ttype field 604 specifying the type of read request (e.g., READ or RWITM) received from the processor core 102, an address field 606 specifying the target real address specified by the processor core 102, an MTag field 608 uniquely identifying the RC machine 512, and a conditional field 610 set to indicate that return of conditional data from an IMC 124 (or its associated L3 cache 123, if present) is permitted.

Following block 810, the process bifurcates and proceeds in parallel to block 812 and to block 814. Block 812 illustrates RC machine 512 monitoring for receipt, via the system fabric, of the Cresp of the read-type memory access request 600. In response to receipt of the Cresp, the process proceeds to join point 813. At block 814, RC machine 512 resets a number of internal flags and counters utilized by RC machine 512 to manage conditional and/or unconditional data beats received in response to the read-type memory access request 600 issued at block 810. In this example, at block 814 RC machine 512 resets: (1) a sent_abort flag indicating whether or not an abort signal for this request has been sent to the requesting processor core 102, (2) an abort_ACK flag indicating whether the requesting processor core 102 has acknowledged receipt of an abort signal for this request, (3) a C_beat_rcv flag indicating whether or not a conditional (i.e., speculative) data beat has been received for this request, (4) a UC_beat_rcv flag indicating whether or not an unconditional (i.e., non-speculative) data beat has been received for this request, and (5) an all_beats_done flag indicating whether or not all data beats of the cache line requested by this request have been received. In addition, at block 814, RC machine 512 resets the values of unconditional (UC) and conditional (C) counters that respectively count the number of unconditional and conditional data beats received in response to the read-type memory access request 600. Following block 814, the process bifurcates again and proceeds in parallel through page connector A to FIG. 9 (which illustrates how RC machine 512 counts conditional (C) and/or unconditional (UC) data beats received in response to read-type memory access request 600) and through page connector B to FIG. 10 (which depicts how RC machine 512 routes data beats received in response to read-type memory access request 600). Upon completion of the processing in FIG. 9, the process returns to join point 813 of FIG. 8 through page connector C, and upon completion of the processing in FIG. 10, the process returns to join point 813 of FIG. 8 through page connector D.

Once all branches of the process of FIG. 8 reach join point 813, the process proceeds to block 816, which illustrates RC machine 512 determining whether or not the Cresp for the read-type memory access request 600 indicates a retry. If so, the process returns to block 806 (if present) or to block 808 (if block 806 is omitted), both of which have been described. If, however, the Cresp for the read-type memory access request 600 does not indicate retry, but instead indicates successful completion of the read-type memory access request 600 in accordance with the implemented coherence protocol, the process of FIG. 8 ends at block 820.

With reference now to FIG. 9, the process begins at page connector A and then bifurcates into two contemporaneous sub-processes, one counting unconditional data beats received (blocks 900-906) and another counting conditional data beats received (block 910-918). Referring first to the sub-process counting unconditional data beats, RC machine 512 determines at block 900 whether a Cresp has been received that indicates that no unconditional data will be provided to RC machine 512 in response to the read-type memory access request 600. If so, the process passes to join point 919. If, however, no Cresp for the read-type memory access request 600 has yet been received or if a Cresp has been received and does not indicate that no unconditional data will be provided, the process proceeds to block 902, which illustrates RC machine 512 determining whether or not an unconditional data beat (as indicated by its conditional field 710 being reset) has been received. If not, the process returns to block 900, which has been described. If, however, RC machine 512 determines at block 902 that an unconditional data beat has been received in response to the read-type memory access request 600, RC machine 512 additionally determines at block 904 by reference to the UC counter whether or not the unconditional data beat detected at block 902 is a last data beat of the requested cache line of data. If so, the process passes to join point 919; otherwise, the process proceeds to block 906, which illustrates RC machine 512 incrementing its UC counter to reflect the count of unconditional data beats that have been received. Thereafter, the process returns to block 900, which has been described.

Referring now to the sub-process of counting conditional data beats, RC machine 512 determines at block 910 whether a Cresp has been received that indicates that no conditional data will be provided to RC machine 512 in response to the read-type memory access request 600. If so, the process passes to join point 919, which is described below. If, however, no Cresp for the read-type memory access request 600 has yet been received or if a Cresp has been received and does not indicate that no conditional data will be provided, the process proceeds to block 912, which illustrates RC machine 512 determining whether a Null data beat (i.e., a data beat 700 with Null field 712 set) has been received in response to the read-type memory access request 600. If so, the process passes to join point 919. Otherwise, the process proceeds to block 914, which illustrates RC machine 512 determining whether or not a conditional data beat (as indicated by its conditional field 710 being set) has been received. If not, the process returns to block 910, which has been described. If, however, RC machine 512 determines at block 914 that a conditional data beat has been received in response to the read-type memory access request 600, RC machine 512 additionally determines at block 916 by reference to the C counter whether or not the conditional data beat detected at block 914 is a last data beat of the requested cache line of data. If so, the process passes to join point block 919; otherwise, the process proceeds to block 918, which illustrates RC machine 512 incrementing its C counter to reflect the count of conditional data beats that have been received. Thereafter, the process returns to block 910, which has been described.

Once both sub-processes shown in FIG. 9 have reached join point 919, the process proceeds to block 920. At block 920, RC machine 512, sets the all_beats_done flag to indicate that it has received all data beats comprising the cache line of data requested by the read-type memory access request 600. The process then returns to FIG. 8 via page connector C.

Referring now to FIG. 10, the process begins at page connector B and then proceeds in parallel to two contemporaneous sub-processes for handling beats of unconditional data (blocks 1000-1010) and for handling beats of conditional data (blocks 1020-1028). Referring now specifically to block 1000, RC machine 512 determines whether or not an unconditional data beat (i.e., a data beat 700 having conditional field 710 reset) has been received on the system fabric from an IMC 124 (or its associated L3 cache 123, if present) or an L2 cache 110 in the current cycle. If not, the process passes to join point 1029. If, however, RC machine 512 determines at block 1000 that an unconditional data beat 700 has been received on the system fabric in the current cycle, RC machine 512 causes the unconditional data beat to be placed in its associated RCDAT buffer 522 (block 1002). In addition, RC machine 512 determines by reference to the C_beat_rcv flag whether or not a conditional data beat 700 has been received in response to the read-type memory access request 600 (block 1004). If so, at block 1006, RC machine 512 preemptively sets the sent_abort and abort_ACK flags in order to force the discarding of any conditional data beats 700 that may be received, as discussed below with reference to block 1026. Based on an affirmative determination at block 1004 or following block 1006, the process proceeds to block 1008, which illustrates RC machine 512 determining whether the sent_abort flag is set. If so, the process proceeds to join point 1029. If not, RC machine 512 sends an abort signal to the requesting processor core 102 to force cancellation of any speculative execution based on any previously returned conditional data beats returned in response to the read-type memory access request 600 and sets the sent_abort flag to indicate the abort signal has been sent (block 1010). Thereafter, the process proceeds to join point 1029.

With reference now to block 1020, RC machine 512 determines whether or not a conditional data beat 700 (i.e., a data beat 700 having conditional field 710 set) has been received on the system fabric from an IMC 124 or its associated L3 cache 123, if present, in the present cycle. If not, the process passes to join point 1029. If, however, RC machine 512 determines at block 1020 that a conditional data beat 700 has been received in the present cycle, RC machine 512 sets the C_beat_rcv flag to indicate a beat of conditional data has been received (block 1022). RC machine 512 additionally determines at block 1024 whether or not the sent_abort flag has been set, for example, at block 1006 or block 1010. If so, RC machine 512 discards the conditional data beat 700 (block 1026), and the process proceeds to join point 1029. If, however, RC machine 512 determines at block 1024 that the sent_abort flag is not set, RC machine 512 causes the conditional data beat 700 to be placed in the RCDAT buffer 522 associated with RC machine 512 (block 1028). The process then passes to join point 1029.

Once the two contemporaneous sub-processes shown at blocks 1000-1010 and blocks 1020-1028 converge at join point 1029, the process of FIG. 10 proceeds to block 1030. Block 1030 depicts RC machine 512 determining whether or not an acknowledgement of an abort signal (i.e., abort_ACK) has also been received from the requesting processor core 102, as discussed further below at block 1116 of FIG. 11. If so, RC machine 512 sets its abort_ACK flag (block 1032). Based on a negative determination at block 1030 or following block 1032, the process proceeds to block 1034, which illustrates RC machine 512 determining whether a valid data beat is present in its associated RCDAT buffer 522. If so, the process proceeds to block 1036, which illustrates RC machine 512 forwarding the data beat to the requesting processing core 102. Based on a negative determination at block 1034 or following block 1036, RC machine 512 determines at block 1038 whether all data beats of the requested cache line have been received (e.g., whether the all_beats_done flag is set) and sent to the requesting processor core 102. If not, the process returns to blocks 1000 and 1020 to process additional unconditional or conditional data beat(s), as described above. If, however, RC machine 512 determines at block 1038 that all beats of the requested cache line have been received and sent to the requesting processor core 102, the process returns through page connector D to FIG. 8.

Figure 11:
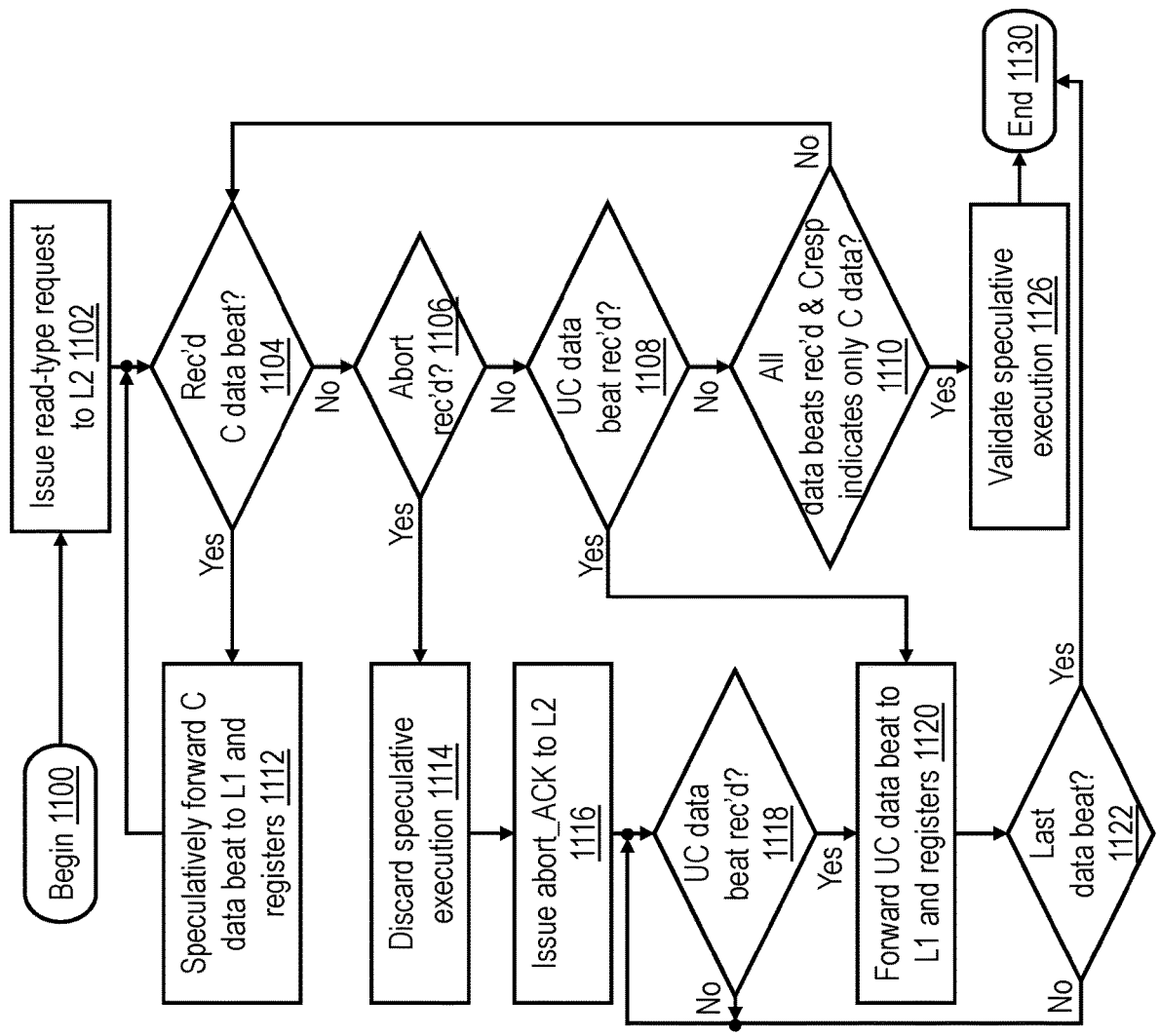
FIG. 11 is a high-level logical flowchart of an exemplary process by which a processor core issues a read-type memory access request and handles returned data in accordance with one embodiment.

With reference now to FIG. 11 is a high-level logical flowchart of an exemplary process by which a processor core 102 issues a read-type memory access request to its associated L2 cache 110 and handles returned data in accordance with one embodiment. The illustrated process begins at block 1100, for example, in response to execution by LSU 555 of a memory access instruction that causes the generation of a read-type memory access request that cannot be wholly satisfied in the L1 cache 108 of the processor core 102. The read-type memory access request may include, for example, at least a transaction type (ttype) and a target real address of a cache line of data to be accessed. The process then proceeds to block 1102, which illustrates the processor core 102 issuing the read-type request to its local L2 cache 110.

Following block 1102, the processor core 102 enters a monitoring loop in which the processor core 102 monitors for occurrence of any of the following events: receipt from the associated L2 cache 110 of a conditional data beat responsive to the read-type memory access request (block 1104), receipt from the associated L2 cache 110 of an abort signal (block 1106), receipt from the associated L2 cache 110 of an unconditional data beat responsive to the read-type memory access request (block 1108), and the receipt of all data beats in the cache line of data requested by the read-type memory access request plus a Cresp indicating that only conditional data will be provided (block 1110). If none of these events is detected, processor core 102 continues monitoring at blocks 1104-1110.

In response to detection of receipt of a conditional data beat at block 1104, the processor core 102 speculatively forwards the conditional data beat to L1 cache 108 and registers 107 for storage and possibly use in speculative execution of instructions by execution units 106 (block 1112). Following block 1112, the process returns to blocks 1104-1110.

In response to detection of receipt of an abort signal from the associated L2 cache 110 at block 1106, processor core 102 discards any speculative execution results dependent on conditional data returned in response to the read-type memory access request (block 1114) and issues an abort_ACK response to the local L2 cache 110 (block 1116). It should also be noted that once the process of FIG. 11 enters portion of the process formed of blocks 1114 to block 1122, the processor core 102 can also discontinue monitoring for receipt of conditional data beats since no more conditional data beats will be sent by the local L2 cache 110 given the setting of the sent_abort flag in FIG. 10. The process of FIG. 11 passes from block 1116 to block 1118, which illustrates processor core 102 monitoring for receipt of an unconditional data beat from the associated L2 cache 110. In response to receipt of an unconditional data beat at block 1118 or at block 1108, the process passes to block 1120, which illustrates processor core 102 forwarding the unconditional data beat to its L1 cache 108 and registers 107 for storage and possible use in execution of instructions by execution units 106 (block 1120). If the unconditional data beat is the last data beat of the cache line of requested data as determined at block 1122, the process of FIG. 11 ends at block 1130. Otherwise, the process of FIG. 11 returns to block 1118, which has been described.

Referring now to block 1110, in response to processor core 102 determining that all beats of the cache line of data requested by the read-type memory access request have been received and a Cresp has been received that indicates the only conditional data beats will be provided in response to the read-type memory access request, processor core 102 validates the speculative execution, if any, performed by processor core 102 utilizing the conditional data beats, thus making the results of the speculative execution non-speculative and part of the architected state of the processor core 102 (block 1126). The process of FIG. 11 thereafter ends at block 1130.

Figure 12:
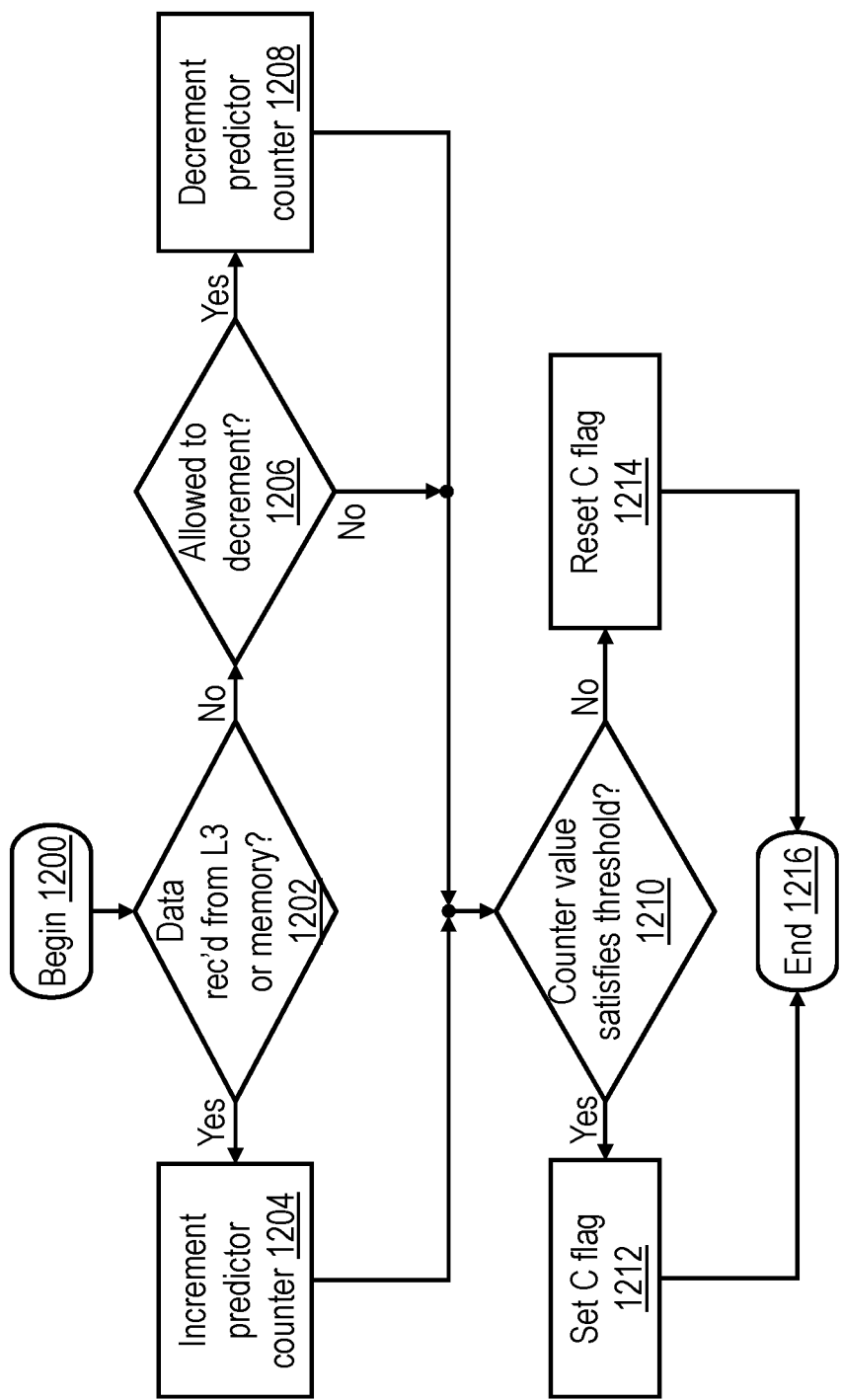
FIG. 12 is a high-level logical flowchart of an exemplary process by which a master of a read-type memory access request determines whether to permit return of conditional data in accordance with one embodiment.

Referring now to FIG. 12, there is depicted a high-level logical flowchart of an exemplary process by which a master (e.g., an L2 cache 110) determines whether to permit return of conditional data for a read-type memory access request 600 issued on the system fabric of data processing system 200 in accordance with one embodiment. The illustrated process can be performed, for example, by optional L2 predictor 525 of a L2 cache 110 in order to facilitate the determination made at block 808 of FIG. 8. In one exemplary embodiment, L2 predictor 525 includes a saturating counter 527 that is constrained to have a non-negative value and a conditional (C) flag 529 that is set to indicate that conditional data is permitted in response to a read-type memory access request and that is reset otherwise.

The process of FIG. 12 begins at block 1200, for example, in response to completion of servicing by L2 cache 110 of a read-type memory access request 600 issued on the system fabric of data processing system 200. The process then proceeds to block 1202, which illustrates L2 predictor 525 determining whether or not the data source from which the completed read-type memory access request 600 received the requested cache line of data was an IMC 124 or an associated L3 cache 123. If so, L2 predictor 525 increments counter 527 in a saturating fashion (block 1204), and the process proceeds to block 1210. If not, L2 predictor 525 determines at block 1206 whether or not counter 527 can be decremented. For example, at block 1206, L2 predictor 525 may determine whether counter 527 has a value of 1 or greater and a pseudo-random signal asserted in a predetermined percentage of cycles (which can be generated, for example, by a linear feedback shift register (LFSR)) indicates counter 527 can be decremented. If not, the process proceeds directly to block 1210. In response to a determination at block 1206 that counter 527 can be decremented, L2 predictor 525 decrements counter 527 in a saturating fashion (block 1208), and the process proceeds to block 1210.

Block 1210 illustrates L2 predictor 525 determining whether or not the value of counter 527 satisfies (e.g., is greater than or equal to) a threshold. If not, L2 predictor 525 resets conditional (C) flag 529 to indicate that conditional data is not currently permitted for read-type memory access requests (block 1214). If, however, L2 predictor 525 determines at block 1210 that the value of counter 527 satisfies the threshold, L2 predictor 525 sets conditional (C) flag 529 to indicate that conditional data is currently permitted for read-type memory access requests (block 1212). Following block 1212 or block 1214, the process of FIG. 12 ends at block 1216.

Figure 13:
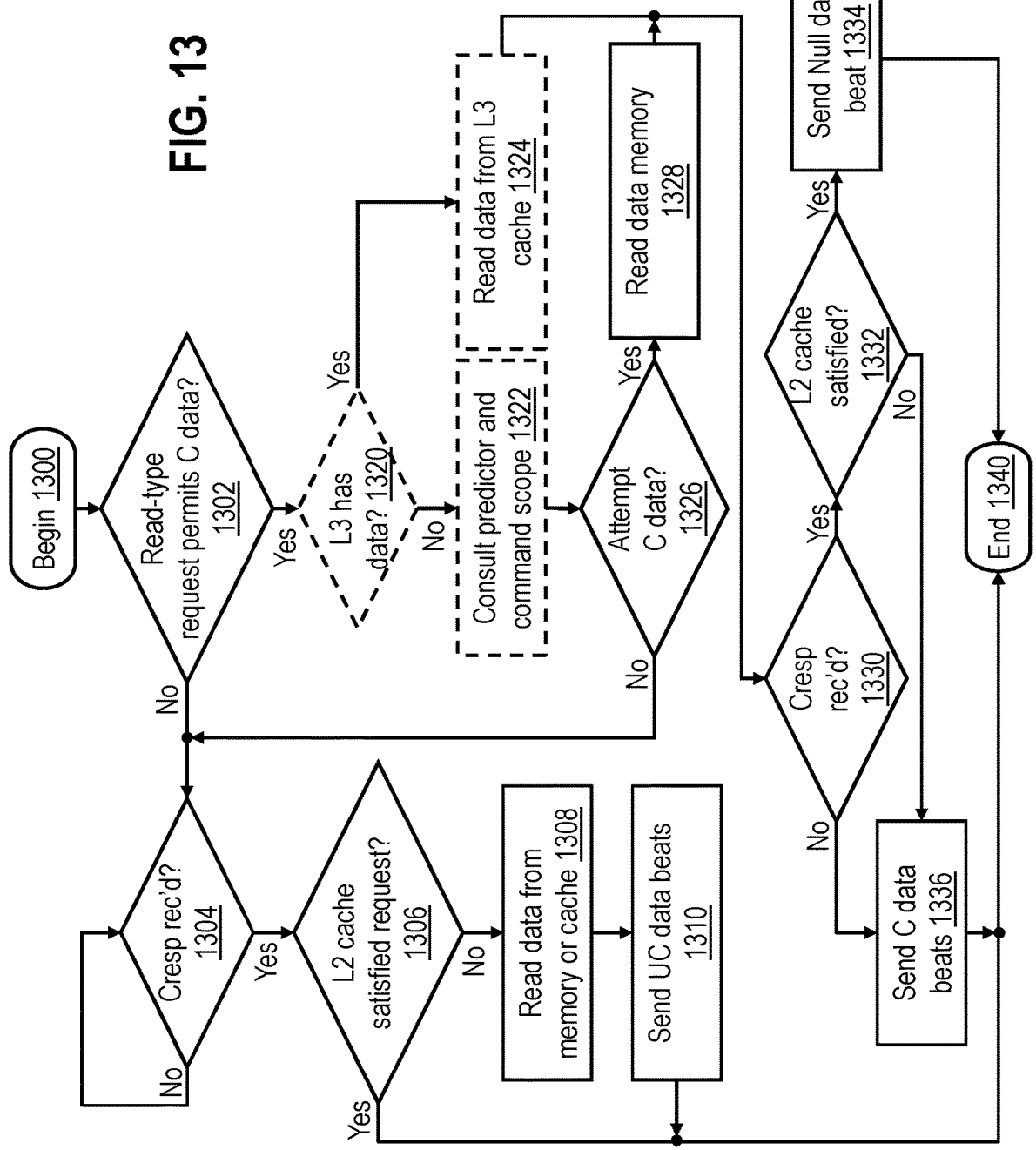
FIG. 13 is a high-level logical flowchart of an exemplary process by which a memory controller and/or lower level cache responds to a read-type memory access request in accordance with one embodiment.

With reference now to FIG. 13, there is illustrated a high-level logical flowchart of an exemplary process by which a memory controller (e.g., IMC 124) or an associated lower level cache (e.g., L3 cache 123) responds to a read-type memory access request 600 on the system fabric of data processing system 200 in accordance with one embodiment.

The process of FIG. 13 begins at block 1300, for example, in response to receipt by an IMC 124 in data processing system 200 of a read-type memory access request 600 that specifies in address field 606 a target real address for which the IMC 124 is responsible. In response to receipt of the read-type memory access request 600, IMC 124 determines at block 1302 whether or not conditional field 610 of the read-type memory access request 600 is set to indicate that the return of conditional data prior to Cresp is permitted. If not, the process proceeds to block 1304, which illustrates IMC 124 awaiting receipt of the Cresp for the read-type memory access request 600. In response to receipt of the Cresp at block 1304, IMC 124 determines at block 1306 whether or not the Cresp indicates that the cache line of data requested by the read-type memory access request 600 was sourced by an L2 cache 110. If so, no further action by IMC 124 is required, and the process of FIG. 13 ends at block 1340. If, however, IMC 124 determines at block 1306 that the Cresp of the read-type memory access request 600 indicates that the data requested by the read-type memory access request 600 was not sourced by any L2 cache 110, IMC 124 causes the cache line of data requested by the read-type memory access request 600 to be read from system memory 132 or its associated L3 cache 123 (block 1308) and transmitted via the system fabric to the requesting master in one or more data beats 700 (block 1310). As indicated, each of the data beats 700 has conditional field 710 reset to indicate that the data in data field 708 is unconditional. The process then ends at block 1340.

Returning to block 1302, in response to IMC 124 determining that the read-type memory access request 600 has its conditional field 610 set to indicate that conditional data is permitted by the master of the request, the process proceeds to optional block 1320 if IMC 124 has an optional associated L3 cache 123. At block 1320, L3 cache 123 determines whether or not the cache line identified by the target real address specified in address field 606 of the read-type memory access request 600 is present in L3 cache 123. If so, IMC 124 causes the cache line of data specified by the target real address to be read from L3 cache 123, as shown at optional block 1324. The process then proceeds to block 1330, which is described below. In response to a negative determination at block 1320, the process proceeds to optional block 1322 if IMC 124 implements optional LPC predictor 125. Block 1322 depicts IMC 124 consulting LPC predictor 125 and the scope of broadcast of the read-type memory access request 600 to determine if delivery of conditional data prior to receipt of Cresp should be attempted. One example of a method by which LPC predictor 125 indicates whether conditional data should be attempted is described below in detail with reference to FIG. 14. At block 1326, IMC 124 determines whether or not to attempt delivery of conditional data responsive to the read-type memory access request 600. For example, in an embodiment in which optional block 1322 is implemented, IMC 124 may determine to attempt delivery of conditional data if LPC predictor 125 indicates to attempt delivery of conditional data and/or the master of the read-type memory access request 600 is located in the same processing node 202 as IMC 124. If an embodiment in which optional block 1322 is not implemented, IMC 124 may simply always attempt delivery of conditional data if permitted by the read-type memory access request 600.

In response to a determination at block 1326 to not attempt delivery of conditional data, the process passes to block 1304 and following blocks, which have been described. If, however, IMC 124 determines at block 1326 to attempt delivery of conditional data, IMC 124 reads out the cache line of data requested by the read-type memory access request 600 from its associated system memory 132 (block 1328). At block 1330, IMC 124 determines whether or not the Cresp of the read-type memory access request 600 has been received. If not, IMC 124 transmits the requested cache line of data to the requesting master via the system fabric in one or more data beats 700 each marked as conditional in conditional field 710 (block 1336). Thereafter, the process of FIG. 13 ends at block 1340.

Returning to block 1330, in response to a determination that the Cresp for the read-type memory access request 600 has been received, IMC 124 determines at block 1332 whether the Cresp indicates that the cache line of data requested by the read-type memory access request 600 was sourced by an L2 cache 110. If so, IMC 124 transmits to the requesting master via the system fabric a data beat 700 marked in Null field 712 as a Null data beat (block 1334). If, however, IMC 124 determines at block 1332 that the Cresp of the read-type memory access request 600 indicates that the data requested by the read-type memory access request 600 was not sourced by any L2 cache 110, the process proceeds to block 1332, which has been described. Following block 1336 or block 1334, the process of FIG. 13 ends at block 1340.

Figure 14:
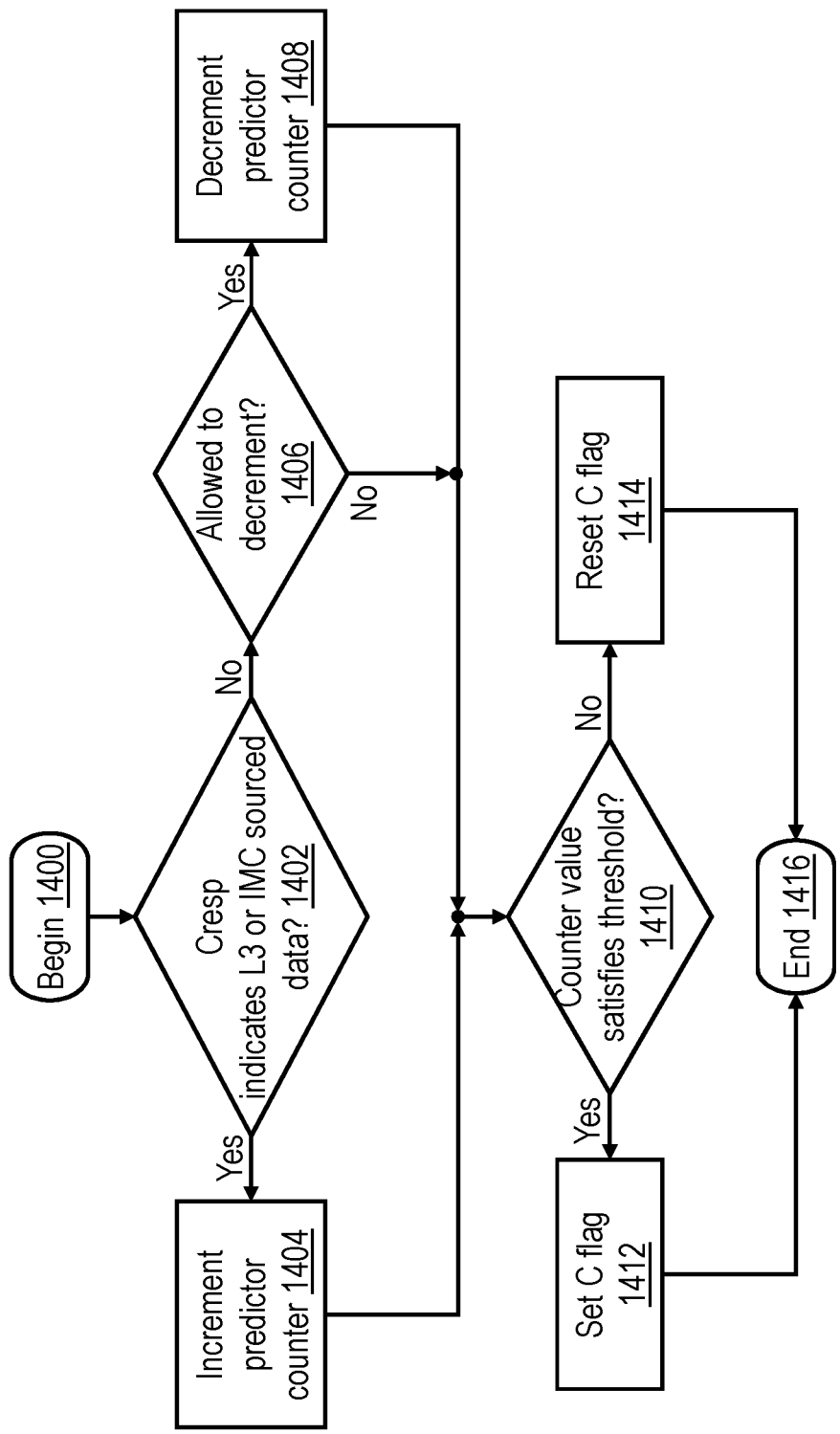
FIG. 14 is a high-level logical flowchart of an exemplary process by which a predictor associated with a lower level cache or system memory controller determines whether to provide conditional data for a read-type memory access request in accordance with one embodiment.

Referring now to FIG. 14, there is depicted a high-level logical flowchart of an exemplary process by which a predictor associated with a lower level cache or system memory controller determines whether to provide conditional data for a read-type memory access request 600 received on the system fabric of a data processing system 200 in accordance with one embodiment. The illustrated process can be performed, for example, by optional LPC predictor 125 of an IMC 124 in order to facilitate the determination made at block 1326 of FIG. 13. In one exemplary embodiment, LPC predictor 125 includes a saturating counter 537 that is constrained to have a non-negative value and a conditional (C) flag 539 that is set to indicate that delivery of conditional data should be attempted in response to receipt of a read-type memory access request 600 and that is reset otherwise.

The process of FIG. 14 begins at block 1400, for example, in response to receipt by an IMC 124 of a Cresp of a read-type memory access request 600 issued on the system fabric of data processing system 200. The process then proceeds to block 1402, which illustrates LPC predictor 125 determining whether or not the Cresp indicates that the data source for the cache line of data requested by the read-type memory access request 600 is this IMC 124 or its associated L3 cache 123 (if present). If so, LPC predictor 125 increments counter 537 in a saturating fashion (block 1404), and the process proceeds to block 1410. If not, LPC predictor 125 determines at block 1406 whether or not counter 537 can be decremented. For example, at block 1406, LPC predictor 125 may determine whether counter 537 has a value of 1 or greater and a pseudo-random signal asserted in a predetermined percentage of cycles (which can be generated, for example, by a linear feedback shift register (LFSR)) indicates counter 537 can be decremented. If not, the process proceeds directly to block 1410. In response to a determination at block 1406 that counter 537 can be decremented, LPC predictor 125 decrements counter 537 in a saturating fashion (block 1408), and the process proceeds to block 1410.

Block 1410 illustrates LPC predictor 125 determining whether or not the value of counter 537 satisfies (e.g., is greater than or equal to) a threshold. If not, LPC predictor 125 resets conditional (C) flag 539 to indicate that conditional data should not be attempted in response to read-type memory access requests (block 1412). If, however, LPC predictor 125 determines at block 1410 that the value of counter 537 satisfies the threshold, L2 predictor 125 sets conditional (C) flag 539 to indicate that conditional data is currently permitted for read-type memory access requests (block 1414). Following block 1412 or block 1414, the process of FIG. 14 ends at block 1416.

Figure 15:
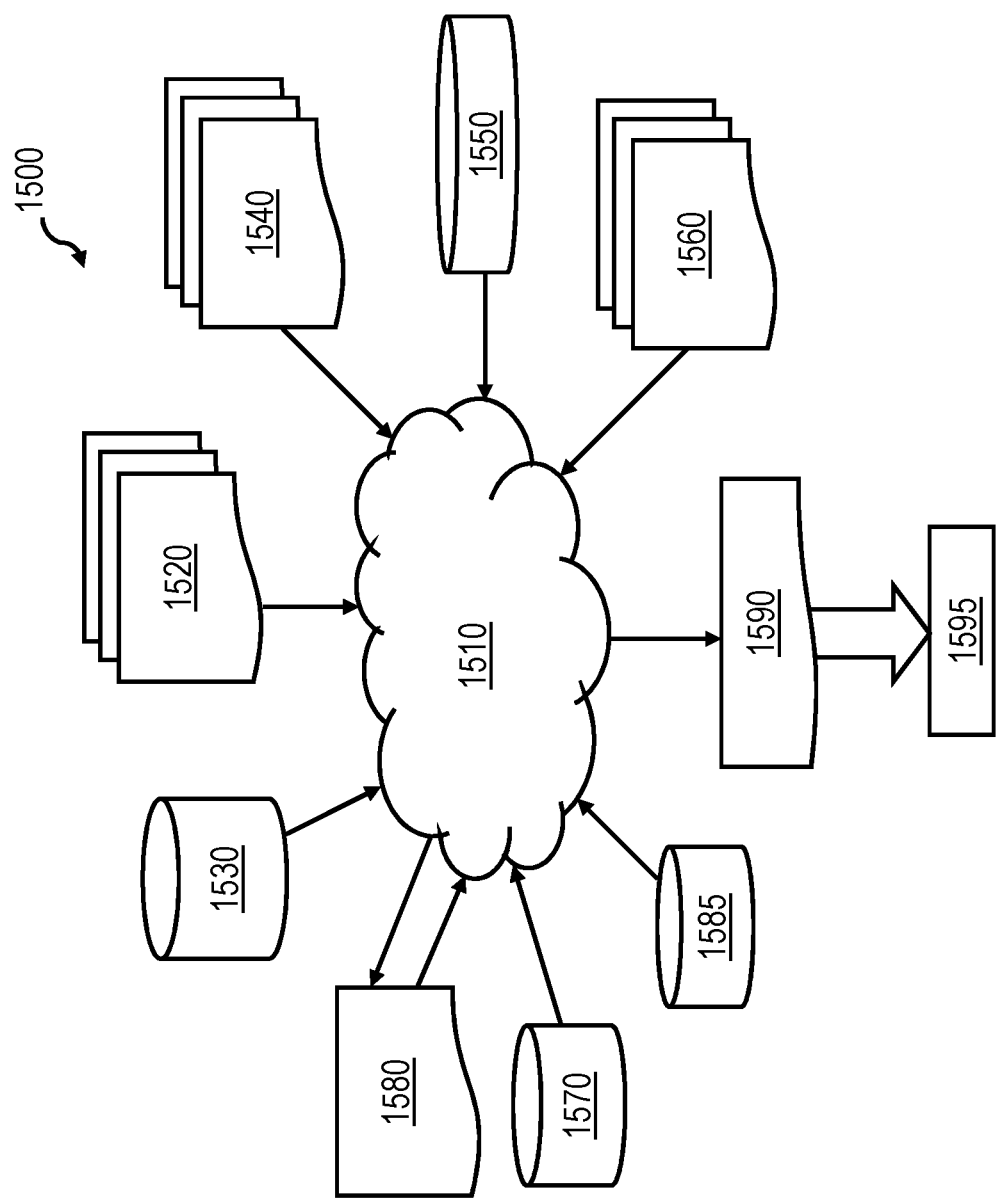
FIG. 15 illustrates an exemplary design process in accordance with one embodiment.

With reference now to FIG. 15, there is depicted a block diagram of an exemplary design flow 1500 used for example, in semiconductor IC logic design, simulation, test, layout, and manufacture. Design flow 1500 includes processes, machines and/or mechanisms for processing design structures or devices to generate logically or otherwise functionally equivalent representations of the design structures and/or devices described above and shown herein. The design structures processed and/or generated by design flow 1500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1500 may vary depending on the type of representation being designed. For example, a design flow 1500 for building an application specific IC (ASIC) may differ from a design flow 1500 for designing a standard component or from a design flow 1500 for instantiating the design into a programmable array, for example a programmable gate array (PGA) or a field programmable gate array (FPGA) offered by Altera® Inc. or Xilinx® Inc.

FIG. 15 illustrates multiple such design structures including an input design structure 1020 that is preferably processed by a design process 1510. Design structure 1520 may be a logical simulation design structure generated and processed by design process 1510 to produce a logically equivalent functional representation of a hardware device. Design structure 1520 may also or alternatively comprise data and/or program instructions that when processed by design process 1510, generate a functional representation of the physical structure of a hardware device. Whether representing functional and/or structural design features, design structure 1520 may be generated using electronic computer-aided design (ECAD) such as implemented by a core developer/designer. When encoded on a machine-readable data transmission, gate array, or storage medium, design structure 1520 may be accessed and processed by one or more hardware and/or software modules within design process 1510 to simulate or otherwise functionally represent an electronic component, circuit, electronic or logic module, apparatus, device, or system such as those shown herein. As such, design structure 1520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1510 preferably employs and incorporates hardware and/or software modules for synthesizing, translating, or otherwise processing a design/simulation functional equivalent of the components, circuits, devices, or logic structures shown herein to generate a netlist 1580 which may contain design structures such as design structure 1520. Netlist 1580 may comprise, for example, compiled or otherwise processed data structures representing a list of wires, discrete components, logic gates, control circuits, I/O devices, models, etc. that describes the connections to other elements and circuits in an integrated circuit design. Netlist 1580 may be synthesized using an iterative process in which netlist 1580 is resynthesized one or more times depending on design specifications and parameters for the device. As with other design structure types described herein, netlist 1580 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1510 may include hardware and software modules for processing a variety of input data structure types including netlist 1580. Such data structure types may reside, for example, within library elements 1530 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1540, characterization data 1550, verification data 1560, design rules 15150, and test data files 1585 which may include input test patterns, output test results, and other testing information. Design process 1510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1510 without deviating from the scope and spirit of the invention. Design process 1510 may also include modules for performing standard circuit design processes such as timing analysis, verification, design rule checking, place and route operations, etc.

Design process 1510 employs and incorporates logic and physical design tools such as HDL compilers and simulation model build tools to process design structure 1520 together with some or all of the depicted supporting data structures along with any additional mechanical design or data (if applicable), to generate a second design structure 1590. Design structure 1590 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1520, design structure 1590 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1590 may comprise a compiled, executable HDL simulation model that functionally simulates the devices shown herein.

Design structure 1590 may also employ a data format used for the exchange of layout data of integrated circuits and/or symbolic data format (e.g., information stored in a GDSII (GDS2), GL1, OASIS, map files, or any other suitable format for storing such design data structures). Design structure 1590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1590 may then proceed to a stage 1595 where, for example, design structure 1590: proceeds to tape-out, is released to manufacturing, is released to a mask house, is sent to another design house, is sent back to the customer, etc.

As has been described, in at least one embodiment, data access latency in a multiprocessor data processing system is reduced by enabling a system memory or an associated lower level cache to source data requested by a snooped read-type memory access request prior to receipt of a systemwide coherence response by the data source.

According to at least one embodiment, data access latency in a multiprocessor data processing system is reduced by enabling multiple memory devices, including a system memory or associated lower level cache, to act as data sources for a given read-type memory access request.

In at least one embodiment, a multiprocessor data processing system includes multiple vertical cache hierarchies supporting a plurality of processor cores, a system memory, and an interconnect fabric coupled to the system memory and the multiple vertical cache hierarchies. Based on a request of a requesting processor core among the plurality of processor cores, a master in the multiprocessor data processing system issues, via the interconnect fabric, a read-type memory access request. The master receives via the interconnect fabric at least one beat of conditional data issued speculatively on the interconnect fabric by a controller of the system memory prior to receipt by the controller of a systemwide coherence response for the read-type memory access request. The master forwards the at least one beat of conditional data to the requesting processor core.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a multiprocessor data processing system including multiple vertical cache hierarchies supporting a plurality of processor cores, a system memory, and an interconnect fabric coupled to the system memory and the multiple vertical cache hierarchies, the method comprising:
    based on a request of a requesting processor core among the plurality of processor cores, a master in the multiprocessor data processing system issuing, via the interconnect fabric, a read-type memory access request;
    the master thereafter receiving via the interconnect fabric at least one beat of conditional data issued speculatively on the interconnect fabric by a controller of the system memory prior to receipt by the controller of a systemwide coherence response for the read-type memory access request; and
    the master forwarding the at least one beat of conditional data to the requesting processor core to enable speculative execution of at least one instruction by the requesting processor core utilizing the at least one beat of conditional data;
    the master, in response to the read-type memory access request, additionally receiving at least one beat of unconditional data from a second vertical cache hierarchy among the multiple vertical cache hierarchies; and
    based on receiving at least one data beat of unconditional data, the master signaling the processor core to abort speculative execution of said at least one instruction.

2. The method of claim 1, wherein:
    the master is within a first vertical cache hierarchy among the multiple vertical cache hierarchies; and
    the master, in response to the read-type memory access request, additionally receiving at least one beat of unconditional data from a second vertical cache hierarchy among the multiple vertical cache hierarchies.

3. The method of claim 1, further comprising:
    the master providing an indication, within the read-type memory access request, that conditional data may be returned to the master.

4. The method of claim 3, further comprising:
    the master providing the indication based on a predictor indicating that data responsive to the read-type memory access request is likely to be returned by the controller of the system memory.

5. The method of claim 1, further comprising:
    the controller determining whether to speculatively issue the at least one beat of conditional data on the interconnect fabric prior to receipt by the controller of a systemwide coherence response based on a predictor indicating that data responsive to the read-type memory access request is likely to be returned by the controller.

6. A processing unit, comprising:
    a processor core;
    interconnect logic configured to couple the processing unit to a interconnect fabric of a multiprocessor data processing system;
    a first vertical cache hierarchy supporting the processor core, the first vertical cache hierarchy including a master that is configured to perform:
        based on a request of the processor core, issuing, via the interconnect fabric, a read-type memory access request;
        thereafter receiving via the interconnect fabric at least one beat of conditional data issued speculatively on the interconnect fabric by a controller of a system memory prior to receipt by the controller of a systemwide coherence response for the read-type memory access request;
        forwarding the at least one beat of conditional data to the requesting processor core to enable speculative execution of at least one instruction by the processor core utilizing the at least one beat of conditional data;
        based on the read-type memory access request, additionally receiving at least one beat of unconditional data from a second vertical cache hierarchy among the multiple vertical cache hierarchies; and
        based on receiving at least one data beat of unconditional data, the master signaling the processor core to abort speculative execution of said at least one instruction.

7. The processing unit of claim 6, wherein the master is further configured to perform:
    in response to the read-type memory access request, additionally receiving at least one beat of unconditional data from a second vertical cache hierarchy among the multiple vertical cache hierarchies.

8. The processing unit of claim 6, wherein the master is further configured to perform:
    providing an indication, within the read-type memory access request, that conditional data may be returned to the master.

9. The processing unit of claim 8, wherein providing the indication includes:
    the master providing the indication based on a predictor indicating that data responsive to the read-type memory access request is likely to be returned by the controller of the system memory.

10. A multiprocessing data processing system, comprising:
    multiple processing units in accordance with claim 6; and
    the system interconnect coupling multiple processing units.

11. A design structure tangibly embodied in a machine-readable storage device for designing, manufacturing, or testing an integrated circuit, the design structure comprising:
    a processing unit, including:
        a processor core;
        interconnect logic configured to couple the processing unit to a interconnect fabric of a multiprocessor data processing system;
        a first vertical cache hierarchy supporting the processor core, the first vertical cache hierarchy including a master that is configured to perform:

based on a request of the processor core, issuing, via the interconnect fabric, a read-type memory access request;

thereafter receiving via the interconnect fabric at least one beat of conditional data issued speculatively on the interconnect fabric by a controller of a system memory prior to receipt by the controller of a systemwide coherence response for the read-type memory access request;

forwarding the at least one beat of conditional data to the requesting processor core to enable speculative execution of at least one instruction by the processor core utilizing the at least one beat of conditional data;

the master, in response to the read-type memory access request, additionally receiving at least one beat of unconditional data from a second vertical cache hierarchy among the multiple vertical cache hierarchies; and based on receiving at least one data beat of unconditional data, the master signaling the processor core to abort speculative execution of said at least one instruction.

12. The design structure of claim 11, wherein the master is further configured to perform:
in response to the read-type memory access request, additionally receiving at least one beat of unconditional data from a second vertical cache hierarchy among the multiple vertical cache hierarchies.

13. The design structure of claim 11, wherein the master is further configured to perform:
providing an indication, within the read-type memory access request, that conditional data may be returned to the master.

14. The design structure of claim 13, wherein providing the indication includes:
the master providing the indication based on a predictor indicating that data responsive to the read-type memory access request is likely to be returned by the controller of the system memory.

* * * * *